(12) United States Patent
Sinha et al.

(10) Patent No.: US 11,567,038 B2
(45) Date of Patent: Jan. 31, 2023

(54) APPARATUS AND METHOD FOR SHAPED WAVEFORM INTERROGATION

(71) Applicant: TRIAD NATIONAL SECURITY, LLC, Los Alamos, NM (US)

(72) Inventors: Dipen N. Sinha, Bay Shore, NY (US); Cristian Pantea, Los Alamos, NM (US)

(73) Assignee: TRIAD NATIONAL SECURITY, LLC, Los Alamos, NM (US)

( * ) Notice: Subject to any disclaimer, the term of this patent is extended or adjusted under 35 U.S.C. 154(b) by 239 days.

(21) Appl. No.: 17/035,483

(22) Filed: Sep. 28, 2020

(65) Prior Publication Data
US 2021/0096109 A1 Apr. 1, 2021

Related U.S. Application Data

(60) Provisional application No. 62/906,360, filed on Sep. 26, 2019.

(51) Int. Cl.
| | |
|---|---|
| *G01N 29/34* | (2006.01) |
| *G01F 1/667* | (2022.01) |
| *G01N 29/30* | (2006.01) |
| *G01N 29/02* | (2006.01) |
| *G01N 9/24* | (2006.01) |

(52) U.S. Cl.
CPC ........... *G01N 29/348* (2013.01); *G01F 1/667* (2013.01); *G01N 9/24* (2013.01); *G01N 29/02* (2013.01); *G01N 29/30* (2013.01)

(58) Field of Classification Search
CPC ........ G01N 29/348; G01N 9/24; G01N 29/02; G01N 29/30; G01N 29/024; G01N 29/032; G01N 2291/011; G01N 2291/015; G01N 2291/018; G01N 2291/02827; G01N 2291/105; G01N 29/341; G01F 1/667
See application file for complete search history.

(56) References Cited

U.S. PATENT DOCUMENTS

| | | | |
|---|---|---|---|
| 6,112,254 A * | 8/2000 | Cherek ............... | F04D 15/0088 710/1 |
| 6,279,378 B1 * | 8/2001 | Sheen .................. | G01N 29/024 73/24.01 |

(Continued)

*Primary Examiner* — Alexander A Mercado
*Assistant Examiner* — John M Royston
(74) *Attorney, Agent, or Firm* — Alston & Bird LLP

(57) ABSTRACT

Described are an apparatus, computer program product, and associated methods for shaped waveform acoustic interrogation of substances and materials to determine one or more properties of the materials or substances. In some embodiments, a shaped waveform is formed by summing two or more different waveforms and an acoustic wave is generated according to the shaped waveform. The acoustic wave is transmitted by one or more transmitting transducers through the substance or material and received by one or more receiving transducers. The shaped waveform acoustic wave can have a duration or a period that is less than about 20 µs and can comprise predetermined frequency content. Characteristics of the shaped waveform acoustic wave, as received at the receiving transducer(s), including characteristics such as amplitude, frequency, time of flight, etc., can be associated with said one or more properties of the substance or material to provide for real-time monitoring of these properties.

18 Claims, 26 Drawing Sheets

(56) References Cited

U.S. PATENT DOCUMENTS

| | | | |
|---|---|---|---|
| 10,352,907 B2 | 7/2019 | Sturtevant et al. | |
| 2012/0055239 A1* | 3/2012 | Sinha | G01F 25/10 73/61.79 |
| 2012/0055253 A1* | 3/2012 | Sinha | G01N 29/222 73/622 |
| 2016/0334255 A1* | 11/2016 | Gestner | G01F 1/667 |
| 2018/0120269 A1 | 5/2018 | Sinha et al. | |

* cited by examiner

APPARATUS AND METHOD FOR SHAPED WAVEFORM INTERROGATION

CROSS-REFERENCE TO RELATED APPLICATIONS

The present application claims priority to, and the benefit of, U.S. Provisional Patent Application No. 62/906,360, filed Sep. 26, 2019, entitled "Shaped Waveform Interrogation of Multiphase Fluids," the entire disclosures of each of which are hereby incorporated herein by reference in their entireties for all purposes. This application also relates to U.S. Patent Application Publication No. 2018/0120269, the entire disclosure of which is hereby incorporated herein by reference in its entirety for all purposes.

GOVERNMENT SUPPORT STATEMENT

The United States government has certain rights in this invention pursuant to Contract No. 89233218CNA000001 between the United States Department of Energy and TRIAD National Security, LLC for the operation of Los Alamos National Laboratory.

BACKGROUND

It can be helpful in many applications to determine the amount and/or composition of various components and/or phases of multiphase substances and materials. One example of an application is multiphase metering of fluids. Components of a multiphase fluid often do not appear in the same phase of the fluid. Determining the amount and/or phase of each component without first separating the components or phases, as is presently the standard practice, can generate major cost savings. Eliminating equipment and unit processes, such as separators, especially for high pressures or large flow rates, can lead to significant cost reduction opportunity in both capital expenditure and operating cost.

Magnetic flow meters, Coriolis meters, Venturi meters, and differential pressure devices may measure total flow accurately, but are incapable of three-phase measurements. Gamma ray meters may also be used for this purpose, but a radioactive source, typically Cs-137, may be required, having associated safety and other regulatory issues. Acoustic tomography using either sound transmission or a Doppler type of measurement has been examined, where high frequency (~1 MHz or above) ultrasonic transducer pairs are arranged along the circumference of a pipe through which a multiphase fluid is flowing. This allows the measurement of gas content in a horizontal plane. Such systems are complicated, computationally intensive, error prone and impractical for regular use.

Doppler measurements may be used if the gas density is not too high. The complexity is readily appreciated by examining the multiphase regimes. As mentioned above, conventional ultrasonic measurements use frequencies greater than several hundreds of kilohertz to more typically in the Megahertz range. A sound wavelength for a 1 MHz frequency is, for instance, 1.5 mm in water and slightly lower in oil. This wavelength is of the same order of magnitude as that of the gas bubbles; therefore, the signal is strongly scattered making measurements complicated. Individual bubbles can affect the measurement, and it is not possible to integrate the results for an accurate gas volume fraction, and the like. Therefore, a need exists for a simple, inexpensive apparatus for performing multi-phase measurements, e.g., three-phase measurements.

SUMMARY

Embodiments of the present disclosure overcome the disadvantages and limitations of the prior art by providing an apparatus and methods for shaped waveform interrogation of multiphase substances and materials, such as multiphase fluids. In some embodiments, any suitable means, such as summing two or more waveforms together or the like, can be used to generate the shaped waveform. In some embodiments, the shaped waveform can consist of a short duration pulse, with a large and well-defined bandwidth, and a prescribed envelope and/or modulation.

Another object of embodiments of the present disclosure is to provide an apparatus and method for determining a gas volume fraction of a fluid in a non-invasive manner.

According to a first embodiment, a method for measuring one or more properties of a multiphase material can be provided or carried out. In some embodiments, the method can comprise: transmitting, from one or more transmitting transducers through a multiphase material, to one or more receiving transducers, an acoustic wave having a shaped waveform and comprising predetermined frequency content, a duration of the acoustic wave being less than a threshold duration; measuring one or more characteristics of the acoustic wave, once received by the one or more receiving transducers; and determining, based at least upon the one or more characteristics of the acoustic wave, the one or more properties of the multiphase material. In some embodiments, the method can further comprise: generating the shaped waveform from a plurality of waveforms. In some embodiments, the plurality of waveforms may include at least one frequency at which an amplitude of the plurality of waveforms are different. In some embodiments, the threshold duration may be between about 0.1 µs and about 20 µs. In some embodiments, the predetermined frequency content comprises a predetermined bandwidth. In some embodiments, the predetermined frequency content comprises one or more frequencies between about 10 kHz and about 50 MHz. In some embodiments, the method can further comprise: comparing the one or more characteristics of the acoustic wave, once received by the one or more receiving transducers, to calibration values associated with one or more properties of the multiphase material as a function of the one or more characteristics of the acoustic wave; and determining the one or more properties of the multiphase material therefrom. In some embodiments, the method can further comprise: receiving, at one or more computing devices, from the one or more receiving transducers, an electrical signal indicative of the acoustic wave as received by the one or more receiving transducers; and filtering the electrical signal to remove frequencies outside of a range of frequencies of the shaped waveform of the acoustic wave. In some embodiments, the plurality of waveforms may comprises one or more from among: a Gaussian waveform, a sinusoidal modulated Gaussian waveform, and a Gabor waveform. In some embodiments, the method can further comprise: sampling the multiphase material; determining the one or more properties of the sample of the multiphase material; transmitting, from the one or more transmitting transducers to the one or more receiving transducers, the acoustic wave having the shaped waveform, wherein the duration of the acoustic wave is less than the threshold duration; measuring the one or more characteristics of the acoustic wave; and generating calibration values based upon at least a comparison of the one or more properties of the sample of the multiphase material and the one or more characteristics of the acoustic wave. In some embodiments, the one or more characteristics of the acoustic wave can comprise at least one from among: sound speed, time of flight, amplitude, amplitude decay, period, frequency, duration, attenuation, modulation, acoustic impedance, acoustic contrast factor, direction of vibration, wavelength, acoustic pressure field, waveform shape, acoustic pressure, acoustic wave velocity, acoustic intensity, sound pressure, angular frequency, wave number, phase angle, propagation speed, absorption coefficient, degree of diffraction, transmission rate, elastic moduli, and third order elastic moduli. In some embodiments, the one or more properties of the multiphase material can comprise at least one from among: chemical composition, mass, density, volume, flow rate, viscosity, dimensions, thickness, fluid pressure, degree of homogeneity, rheology, gas volume fraction, solids loading rate, turbulence, hydrodynamic shearing effects, number and type of components, impurities rate, elasticity, plasticity, specific weight, and adiabatic compressibility.

According to a second embodiment, a method for determining composition information of a multiphase material can be provided or carried out. In some embodiments, the method can comprise: transmitting, from one or more transmitting transducers through a multiphase material, to one or more receiving transducers, an acoustic wave having a shaped waveform and comprising predetermined frequency content, a duration of the acoustic wave being less than a threshold duration; measuring one or more characteristics of the acoustic wave, once received by the one or more receiving transducers, wherein the one or more characteristics comprise at least a time of flight of the acoustic wave; and determining, based at least upon the time of flight of the acoustic wave, the composition information. In some embodiments, the threshold duration is between about 0.1 µs and about 20 µs. In some embodiments, the predetermined frequency content may comprise one or more frequencies between about 10 kHz and about 50 MHz. In some embodiments, the multiphase material may comprise at least a first fluid and a second fluid. In some embodiments, said determining the composition information may comprise: comparing the one or more characteristics of the acoustic wave, once received by the one or more receiving transducers, to calibration values associated with one or more properties of the multiphase material as a function of the time of flight.

According to a third embodiment, a method is provided for determining flow rate of a multiphase material. In some embodiments, the method may comprise: transmitting, from a first transmitting transducer through a multiphase material, a first acoustic wave having a shaped waveform and comprising predetermined frequency content, a duration of the acoustic wave being less than a threshold duration; transmitting, from a second transmitting transducer located a predetermined distance from the first transmitting transducer, through the multiphase material, a second acoustic wave having the shaped waveform and comprising the predetermined frequency content, the duration of the second acoustic wave being less than the threshold duration; receiving by a first receiving transducer the first acoustic wave having the shaped waveform; receiving by the first receiving transducer the second acoustic wave having the shaped waveform; receiving by a second receiving transducer the first acoustic wave having the shaped waveform; receiving by the second receiving transducer the second acoustic wave having the shaped waveform; measuring one or more characteristics of the first acoustic wave, wherein the one or more characteristics comprise at least a time of flight of the first acoustic wave; measuring one or more characteristics of the second acoustic wave, wherein the one or more characteristics comprise at least a time of flight of the second acoustic wave; and determining, based at least upon the time of flight of the first acoustic wave and the time of flight of the second acoustic wave, the flow rate of the multiphase material. In some embodiments, the threshold duration is between about 0.1 µs and about 20 µs. In some embodiments, the predetermined frequency content comprises one or more frequencies between about 10 kHz and about 50 MHz.

According to a fourth embodiment, a method is provided for measuring one or more properties of a multiphase material. In some embodiments, the method can be carried out partially or fully be an apparatus comprising a processor and a memory. In some embodiments, the memory can store program instructions that are configured, when initiated by the processor, to carry out all or some of the method. In some embodiments, the method can comprise: transmitting, from one or more transmitting transducers through a multiphase material, to one or more receiving transducers, an acoustic wave having a shaped waveform and comprising predetermined frequency content, a duration of the acoustic wave being less than a threshold duration; measuring one or more characteristics of the acoustic wave, once received by the one or more receiving transducers; and determining, based at least upon said one or more characteristics of the acoustic wave, said one or more properties of the multiphase material. In some embodiments, the method can further comprise summing two or more different waveforms to produce the shaped waveform. In some embodiments, the two or more different waveforms may include at least one frequency at which an amplitude of the two or more different waveforms are different. In some embodiments, the threshold duration may be between about 0.1 µs and about 20 µs. In some embodiments, the predetermined frequency content may comprise one or more frequencies between about 10 kHz and about 50 MHz. In some embodiments, the acoustic wave may be transmitted during a first time and the method can further comprise: transmitting, during a second time, from said one or more transmitting transducers, through the multiphase material, to said one or more receiving transducers, a second acoustic wave having a second shaped waveform. In some embodiments, the method can further comprise: measuring the one or more characteristics of the second acoustic wave, once received by the one or more receiving transducers; determining, based at least upon the one or more characteristics of the second acoustic wave, the one or more properties of the multiphase material during the second time; and comparing the one or more properties of the multiphase material during the second time to the one or more properties of the multiphase material during the first time. In some embodiments, the method can further comprise: comparing the one or more characteristics of the acoustic wave, once received by the one or more receiving transducers, to calibration values associated with one or more properties of the multiphase material as a function of said one or more characteristics of the acoustic wave; and determining the one or more properties of the multiphase material therefrom. In some embodiments, the method can further comprise: receiving, at one or more computing devices, from the one or more receiving transducers, an electrical signal indicative of said acoustic wave as received by the one or more receiving transducers; and filtering the electrical signal to remove frequencies outside of a range of frequencies of the shaped waveform of the acoustic wave. In some embodiments, the two or more different waveforms may comprise one or more from among: a Gaussian waveform, a sinusoidal modulated Gaussian waveform, a Gabor waveform, an inverse Gabor transform waveform, a discrete Gabor transform waveform, a scaled Gabor transform waveform, and an S transform waveform. In some embodiments, the method can further comprise: sampling the multiphase material; determining the one or more properties of the sample of the multiphase material; transmitting, from said one or more transmitting transducers to said one or more receiving transducers, the acoustic wave having said shaped waveform, wherein said duration of the acoustic wave is less than said threshold duration; measuring said one or more characteristics of said acoustic wave; and generating calibration values based upon at least a comparison of said one or more properties of said sample of said multiphase material and said one or more characteristics of said acoustic wave. In some embodiments, the one or more characteristics of the acoustic wave may comprise at least one from among: sound speed, time of flight, amplitude, amplitude decay, period, frequency, duration, attenuation, modulation, acoustic impedance, acoustic contrast factor, direction of vibration, wavelength, acoustic pressure field, waveform shape, acoustic pressure, acoustic wave velocity, acoustic intensity, sound pressure, angular frequency, wave number, phase angle, propagation speed, absorption coefficient, degree of diffraction, transmission rate, acoustic elasticity, and third order acoustic elasticity. In some embodiments, the one or more properties of the multiphase material may comprise at least one from among: chemical composition, mass, density, volume, flow rate, viscosity, dimensions, thickness, fluid pressure, degree of homogeneity, rheology, gas volume fraction, solids loading rate, turbulence, hydrodynamic shearing effects, number and type of components, impurities rate, elasticity, plasticity, specific weight, and adiabatic compressibility.

According to a fifth embodiment, an apparatus can be provided that is configured for measuring one or more properties of a multiphase material. In some embodiments, the apparatus can comprise: one or more transmitting transducers configured to transmit, through the multiphase material, an acoustic wave having a shaped waveform and comprising predetermined frequency content, a duration of the acoustic wave being less than a threshold duration. In some embodiments, the apparatus can further comprise: one or more receiving transducers configured to receive the acoustic wave transmitted through the multiphase material by said one or more transmitting transducers. In some embodiments, the apparatus can further comprise: a computing device configured to measure one or more characteristics of the acoustic wave received by the one or more receiving transducers, said computing device being further configured to determine, based at least upon said one or more characteristics of the acoustic wave received by the one or more receiving transducers, said one or more properties of the multiphase material. In some embodiments, the one or more transmitting transducers can comprise piezoelectric transducers. In some embodiments, the one or more receiving transducers can comprise one or more from among: contact transducers, non-contact transducers, electromagnetic acoustic transducers, and laser vibrometers. In some embodiments, the computing device may be further configured to cause a waveform generator to generate the acoustic wave having said shaped waveform and comprising said predetermined frequency content by summing two or more different waveforms. In some embodiments, the two or more different waveforms may include at least one frequency at which an amplitude of the two or more different waveforms are different. In some embodiments, the threshold duration may be between about 0.1 µs and about 20 µs. In some embodiments, the predetermined frequency content may comprises one or more frequencies between about 10 kHz and about 50 MHz.

According to a sixth embodiment, a computer program product can be provided that is configured for measuring one or more properties of a multiphase material. In some embodiments, the computer program product may comprise at least one non-transitory computer-readable storage medium having computer executable program code instructions stored therein. In some embodiments, the computer executable program code instructions comprising program code instructions may be configured, upon execution, to at least: transmit, from one or more transmitting transducers through a multiphase material, to one or more receiving transducers, an acoustic wave having a shaped waveform and comprising predetermined frequency content, a duration of the acoustic wave being less than a threshold duration. In some embodiments, the computer executable program code instructions comprising program code instructions may be configured, upon execution, to at least: measure one or more characteristics of the acoustic wave, once received by the one or more receiving transducers. In some embodiments, the computer executable program code instructions comprising program code instructions may be configured, upon execution, to at least: determine, based at least upon said one or more characteristics of the acoustic wave, said one or more properties of the multiphase material. In some embodiments, the computer program product can be stored on one or more memory devices. In some embodiments, the computer program product can be part of an apparatus comprising the one or more memory devices and one or more processors, wherein the computer executable program code instructions comprising program code instructions are configured to be initiated, executed, carried out, or caused to be carried out by said one or more processors.

According to a seventh embodiment, a method for measuring one or more properties of a multiphase fluid can be provided or carried out. In some embodiments, the method can be provided as a computer program product or program code instructions stored on one or more memory devices. In some embodiments, the method can be carried out by one or more processors and/or one or more memory devices. In some embodiments, the method can comprise: transmitting, from one or more transmitting transducers disposed at a first one or more positions on a section of pipe containing the multiphase fluid, to one or more receiving transducers disposed at a second one or more positions on the section of pipe, an acoustic wave having a shaped waveform and comprising a duration of the acoustic wave being less than a threshold duration. In some embodiments, a first portion of the acoustic wave may travel circumferentially about the section of pipe between the one or more transmitting transducers and the one or more receiving transducers. In some embodiments, a second portion of the acoustic wave may travel from the one or more transmitting transducers, through a first wall of the section of pipe, through the multiphase fluid, through a second wall of the section of pipe, and to the one or more receiving transducers. In some embodiments, the method can further comprise: measuring one or more characteristics of the acoustic wave, once received by the one or more receiving transducers. In some embodiments, the method can further comprise: determining, based at least upon said one or more characteristics of the acoustic wave, said one or more properties of the multiphase fluid. In some embodiments, the method can further comprise: transmitting, during a second time, from said one or more transmitting transducers, through the section of pipe containing the multiphase fluid, to said one or more receiving transducers, a second acoustic wave having a second shaped waveform. In some embodiments, the method can further comprise: comparing the one or more characteristics of the acoustic wave once received by the one or more receiving transducers to calibration values associated with the section of pipe and/or the multiphase fluid, said calibration values being associated with said one or more properties of the multiphase fluid as a function of said one or more characteristics of the acoustic wave. In some embodiments, the method can further comprise: determining the one or more properties of the multiphase fluid therefrom. In some embodiments, the acoustic wave may comprise two or more acoustic waves having two or more different waveforms, the two or more different waveforms being overlapping or summed to form the shaped waveform. In some embodiments, a frequency of said acoustic wave may be between about 10 kHz and about 50 MHz. In some embodiments, the duration of said acoustic wave may be between about 0.1 μs and about 20 μs. In some embodiments, the one or more transmitting transducers comprise piezoelectric transducers. In some embodiments, the one or more receiving transducers comprise one or more from among: contact transducers, non-contact transducers, electromagnetic acoustic transducers, and laser vibrometers. In some embodiments, the method can further comprise: receiving an electrical signal, at one or more computing devices, from said one or more receiving transducers, an electrical signal indicative of said acoustic wave as received by the one or more receiving transducers. In some embodiments, the method can further comprise: filtering the electrical signal to remove vibrational frequencies outside of a range of frequencies of the shaped waveform of the acoustic wave. In some embodiments, the two or more different waveforms comprise one or more from among: a Gaussian waveform, a sinusoidal modulated Gaussian waveform, a Gabor waveform, an inverse Gabor transform waveform, a discrete Gabor transform waveform, a scaled Gabor transform waveform, and an S transform waveform. In some embodiments, the acoustic wave is a second acoustic wave transmitted between the one or more transmitting transducers and the one or more receiving transducers during a second time and said measuring is measuring during said second time, and the method may further comprise: determining, during a first time prior to said second time, said one or more properties of an aliquot of said multiphase fluid; transmitting, during said first time, from said one or more transmitting transducers to said one or more receiving transducers, a first acoustic wave having said shaped waveform comprising said two or more overlapping waveforms, said duration of the first acoustic wave being less than said threshold duration; measuring said one or more characteristics of said first acoustic wave; and generating a calibration curve based upon at least a comparison of said one or more properties of said aliquot of said multiphase fluid and said one or more characteristics of said first acoustic wave, wherein said determining is based at least upon said one or more characteristics of said second acoustic wave and said calibration curve.

According to an eighth embodiment, an apparatus is provided that is configured for measuring one or more properties of a multiphase fluid. In some embodiments, the apparatus can be configured to be placed adjacent to or disposed on or about a section of pipe, the section of pipe having an inner volume configured to contain or convey the multiphase fluid. In some embodiments, the apparatus can comprise: one or more transmitting transducers configured to generate an acoustic wave having a shaped waveform, and transmit the acoustic wave through said section of pipe and said multiphase fluid a duration of the acoustic wave being less than a threshold duration; one or more receiving transducers configured to receive the acoustic wave transmitted through said section of pipe by said one or more transmitting transducers; and a computing device configured to determine, based upon one or more characteristics of the acoustic wave received by the one or more receiving transducers, said one or more properties of the multiphase fluid, wherein a first portion of the acoustic wave travels circumferentially about the section of pipe between the one or more transmitting transducers and the one or more receiving transducers, and wherein a second portion of the acoustic wave travels from the one or more transmitting transducers, through a first wall of the section of pipe, through the multiphase fluid, through a second wall of the section of pipe, and to the one or more receiving transducers. In some embodiments, the computing device may be further configured to: compare the one or more characteristics of the acoustic wave, once received by the one or more receiving transducers, to calibration values associated with the section of pipe and/or the multiphase fluid, said calibration values being associated with said one or more properties of the multiphase fluid as a function of said one or more characteristics of the acoustic wave, and determine the one or more properties of the multiphase fluid therefrom. In some embodiments, the acoustic wave comprises two or more acoustic waves having two or more different waveforms, the two or more different waveforms being overlapping or summed to form the shaped waveform. In some embodiments, a frequency of said acoustic wave is between about 10 kHz and about 50 MHz. In some embodiments, the duration of said acoustic wave is between about 0.1 μs and about 20 μs. In some embodiments, the one or more transmitting transducers comprise piezoelectric transducers and wherein said one or more receiving transducers comprise one or more from among: contact transducers, non-contact transducers, electromagnetic acoustic transducers, and laser vibrometers. In some embodiments, the computing device is further configured to: receive, from said one or more receiving transducers, an electrical signal indicative of said acoustic wave as received by the one or more receiving transducers; and cause filtering of the electrical signal to remove vibrational frequencies outside of a range of frequencies of the acoustic wave. In some embodiments, the acoustic wave is a second acoustic wave transmitted during a second time and said computing device is further configured to: determine said one or more properties of said second acoustic wave during said second time, determine, during a first time prior to said second time, one or more properties of an aliquot of said multiphase fluid, cause, during said first time, said one or more transmitting transducers to transmit a first acoustic wave having said shaped waveform and comprising said two or more overlapping waveforms towards the one or more receiving transducers, said duration of the first acoustic wave being less than said threshold duration, measure said one or more characteristics of said first acoustic wave, generate a calibration curve based upon at least a comparison of said one or more properties of said aliquot of said multiphase fluid and said one or more characteristics of said first acoustic wave, and determine said one or more properties of the multiphase fluid based at least upon said one or more characteristics of said second acoustic wave and said calibration curve. In some embodiments, the two or more waveforms may comprise one or more from among: a Gaussian waveform, a sinusoidal modulated Gaussian waveform, a Gabor waveform, an inverse Gabor transform waveform, a discrete Gabor transform waveform, a scaled Gabor transform waveform, and an S transform waveform.

According to a ninth embodiment, a computer program product can be provided for measuring one or more properties of a multiphase fluid. In some embodiments, the computer program product may comprise at least one non-transitory computer-readable storage medium having computer executable program code instructions stored therein. In some embodiments, the computer executable program code instructions comprising program code instructions may be configured, upon execution, to at least: cause one or more transmitting transducers to transmit, towards one or more receiving transducers, an acoustic wave having a shaped waveform, a duration of the acoustic wave being less than a threshold duration, said multiphase fluid being disposed within a section of pipe and substantially between the one or more transmitting transducers and the one or more receiving transducers, wherein a first portion of the acoustic wave travels circumferentially about the section of pipe between the one or more transmitting transducers and the one or more receiving transducers, and wherein a second portion of the acoustic wave travels from the one or more transmitting transducers, through a first wall of the section of pipe, through the multiphase fluid, through a second wall of the section of pipe, and to the one or more receiving transducers. In some embodiments, the computer executable program code instructions comprising program code instructions may be configured, upon execution, to at least: cause measurement of one or more characteristics of the acoustic wave once received by the one or more receiving transducers; and determine, based at least upon said one or more characteristics of the acoustic wave, said one or more properties of the multiphase fluid.

According to a tenth embodiment, a method is provided for measuring a concentration of a material in a multiphase material, said method comprising transmitting an acoustic wave having a shaped waveform and a wide frequency bandwidth, through the multiphase material. In some embodiments, the acoustic wave can be or comprise a pulse, a burst, a chirp, a short duration acoustic wave, or the like. In some embodiments, the acoustic wave can have a particular shaped waveform that has a wide frequency bandwidth. In some embodiments, the acoustic wave can have a shaped waveform that is formed by the summing of two or more different waveforms. In some embodiments, the shaped waveform may comprise two or more waveforms having different phases. In some embodiments, the shaped waveform may comprise two or more waveforms having different durations. In some embodiments, the shaped waveform may comprise two or more waveforms having one or more of: different amplitudes, different periodicities, different frequencies, different bandwidths, different phases, different periods, a different skewness, and/or different shapes. In some embodiments, the method can further comprise measuring, detecting, sensing, or otherwise determining one or more characteristics of the acoustic wave, once the acoustic wave is transmitted through the multiphase material, and comparing the one or more characteristics of the acoustic wave to one or more characteristic calibration values associated with the multiphase material, as a function of the concentration of the material in the multiphase material; and determining the concentration of the material in the multiphase material therefrom In some embodiments, said acoustic wave can have a frequency that is between about 1 MHz and about 5 MHz. In some embodiments, a period or a duration of said acoustic pulse is between about 1 µs and about 5 µs. In some embodiments, the multiphase material comprises an oil/water mixture. In some embodiments, the multiphase material is disposed within or flowing through a section of pipe, a vessel, a lumen, a conduit, or the like. In some embodiments, acoustic transducers disposed about the multiphase material are utilized for transmitting the acoustic wave into the multiphase material and receiving the acoustic wave after it travels through the multiphase material. In some embodiments, the acoustic transducers can comprise contact transducers configured to excite said at least on mechanical vibration on, for example, a section of pipe containing the multiphase material. In some embodiments, the acoustic transducers can comprise transducers configured to emit an acoustic wave directly into the multiphase material rather than via contact with, e.g., a pipe or the like. In some embodiments, the acoustic transducers comprise piezoelectric transducers. In some embodiments, the acoustic wave can be measured, detected, or otherwise determined, after passing through the multiphase material, using a vibration detector or acoustic sensor. In some embodiments, the vibration detector detects vibrations from any location on the pipe section. In some embodiments, the acoustic sensor can directly detect the acoustic wave as propagated through the multiphase material and/or through air about the multiphase material. In some embodiments, said acoustic wave can comprise at least one of: a Gaussian waveform, a sinusoidal modulated Gaussian waveform, a Gabor waveform, an inverse Gabor transform waveform, a discrete Gabor transform waveform, a scaled Gabor transform waveform, and an S transform waveform.

According to an eleventh embodiment, an apparatus is provided for measuring a concentration of a material in a multiphase material, said apparatus comprising one or more transmitting transducers, one or more receiving transducers, and one or more computing devices. In some embodiments, the apparatus is configured to transmit an acoustic wave having a shaped waveform and a wide frequency bandwidth, through the multiphase material. In some embodiments, the apparatus can transmit the acoustic wave through the multiphase material using the one or more transmitting transducers. In some embodiments, the acoustic wave can be or comprise a pulse, a burst, a chirp, a short duration acoustic wave, or the like. In some embodiments, the acoustic wave can have a particular shaped waveform that has a wide frequency bandwidth. In some embodiments, the acoustic wave can have a shaped waveform that is formed by the summing of two or more different waveforms. In some embodiments, the shaped waveform may comprise two or more waveforms having different phases. In some embodiments, the shaped waveform may comprise two or more waveforms having different durations. In some embodiments, the shaped waveform may comprise two or more waveforms having one or more of: different amplitudes, different periodicities, different frequencies, different bandwidths, different phases, different periods, a different skewness, and/or different shapes. In some embodiments, the apparatus can be further configured to measure, detect, sense, or otherwise determine one or more characteristics of the acoustic wave, once the acoustic wave is transmitted through the multiphase material, and compare the one or more characteristics of the acoustic wave to one or more characteristic calibration values associated with the multiphase material, as a function of the concentration of the material in the multiphase material; and determine the concentration of the material in the multiphase material therefrom. In some embodiments, said acoustic wave can have a frequency of between about 1 MHz and about 5 MHz. In some embodiments, a period or a duration of said acoustic pulse is between about 1 μs and about 5 μs. In some embodiments, the multiphase material comprises an oil/water mixture. In some embodiments, the multiphase material is disposed within or flowing through a section of pipe, a vessel, a lumen, a conduit, or the like. In some embodiments, acoustic transducers disposed about the multiphase material are utilized for transmitting the acoustic wave into the multiphase material and receiving the acoustic wave after it travels through the multiphase material. In some embodiments, the one or more transmitting transducers can comprise contact transducers configured to excite said at least on mechanical vibration on, for example, a section of pipe containing the multiphase material. In some embodiments, the one or more transmitting transducers can comprise transducers configured to emit an acoustic wave directly into the multiphase material rather than via contact with, e.g., a pipe or the like. In some embodiments, the one or more transmitting transducers comprise piezoelectric transducers. In some embodiments, the acoustic wave can be measured, detected, or otherwise determined, after passing through the multiphase material, using the one or more receiving transducers, which may comprise a vibration detector, an acoustic sensor, or the like. In some embodiments, the vibration detector can detect vibrations from any location on the pipe section. In some embodiments, the acoustic sensor can directly detect the acoustic wave as propagated through the multiphase material and/or through air about the multiphase material. In some embodiments, said acoustic wave can comprise at least one of: a Gaussian waveform, a sinusoidal modulated Gaussian waveform, a Gabor waveform, an inverse Gabor transform waveform, a discrete Gabor transform waveform, a scaled Gabor transform waveform, and an S transform waveform.

Benefits and advantages of embodiments of the present invention include, but are not limited to, providing an apparatus and method for in-situ, noninvasive measurement of material characteristics, especially for materials in harsh, sterile, or otherwise inaccessible systems. Use of shaped waveform acoustic interrogation permits accurate measurements of material characteristics without requiring, in many embodiments, deconvolution, signal processing, fast Fourier transformation, or other processes in order to determine the material characteristics based on the magnitude or change over time of one or more properties of the shaped waveform acoustic wave. As will be described below, application of the shaped waveform interrogation of materials are beneficial for many industries, applications, systems, devices, and materials.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

Figure 1:
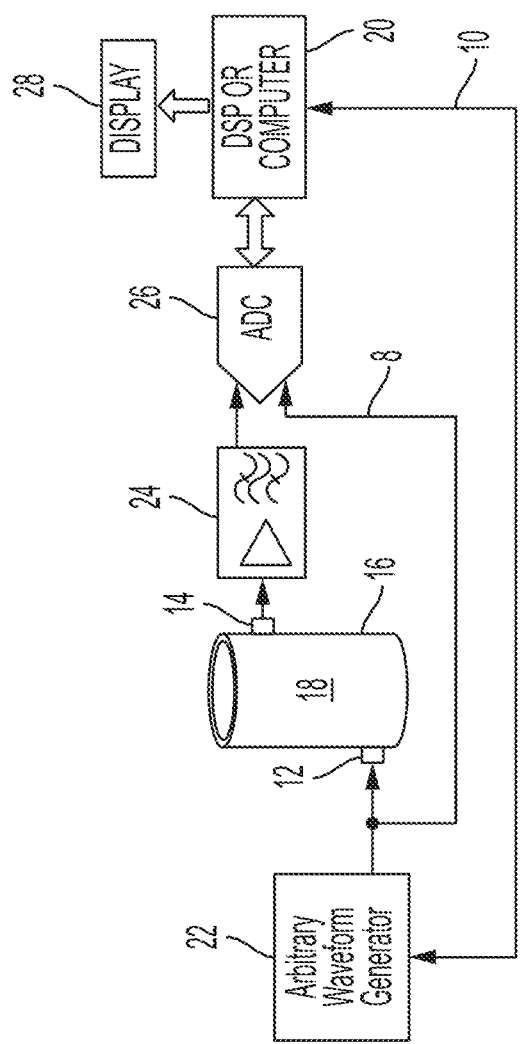
FIG. 1 is a schematic representation of an embodiment of a shaped waveform interrogation of fluids technique (SWIFT) measurement apparatus, according to an embodiment of the current disclosure.

Briefly, embodiments of the present invention include an apparatus and a method for determining, measuring, and monitoring characteristics of multiphase substances or materials, e.g., one or more combinations of liquid, gas, and solids using acoustic interferometry. In some embodiments, the acoustic interferometry approach can comprise generating and transmitting an acoustic wave between one or more transmitting transducers and one or more receiving transducers. In some embodiments, the transducers can be disposed on a pipe, tank, conduit, vessel, or other such container or conveyance device that can retain the multiphase substance or material therein or transmit the multiphase substance or material therethrough. In other embodiments, the transducers may be disposed on the multiphase substance or material. In some embodiments, the acoustic wave can be a short duration sound wave, such as a burst, pulse, or the like. In some embodiments, the acoustic wave can have a duration that is less than a duration threshold, such as about 20 µs, less than about 15 µs, less than about 10 µs, less than about 9 µs, less than about 8 µs, less than about 7 µs, less than about 6 µs, less than about 5 µs, less than about 4 µs, less than about 3 µs, less than about 2 µs, less than about 1 µs, or between about 1 µs and about 5 µs, inclusive of all values and ranges therebetween. In some embodiments, the acoustic wave can have a shaped waveform that comprises two or more waveforms that are overlapping or summed. In some embodiments, the shaped waveform sound wave can be transmitted through the multiphase fluid and changes in the sound wave, e.g., time of flight, amplitude, frequency, waveform, or other sound wave characteristics can be indicative of and interpreted as changes in one or more fluid characteristics. In some embodiments, for instance, a sound speed of the acoustic wave, such as an acoustic wave comprising a fine modulated Gaussian pulse or a Gabor pulse, can be determined from the time of flight of the acoustic wave as transmitted from the transmitting transducer(s), through the multiphase substance or material, and to the receiving transducer(s).

Although the description below describes embodiments for use on multiphase fluids or liquids, it should be understood that the present disclosure is not limited to use on fluids or liquids. Other embodiments may be applied to substances or materials that may include one or more liquids, one or more gasses, one or more solids, or combinations thereof. Also, the description may refer to substances or materials in pipes. Other embodiments may be used on substances or materials that are not within pipes or other containers.

The approaches of acoustic interferometry can be used to measure the physical characteristics of a sound wave transmitted through a fluid, such as a multiphase fluid. To do so, a sound such as an acoustic pulse wave is generated, e.g., using a waveform generator or the like, and is directed through the fluid. In some embodiments, the sound wave can be an ultrasonic sound wave. In some embodiments, a vibrating crystal can generate the sound wave. To indirectly determine the flow rate of a fluid and compositional characteristics of the fluid in situ (that is, in place within a fluid channel, such as a pipe) the acoustic signal or sound wave pulse can be transmitted through a first wall of the fluid channel, through the fluid within the fluid channel, through the second wall of the fluid channel opposite the first wall of the fluid channel and to a receiver or reflector. Signal or wave characteristics such as "time of flight", velocity, wavelength, absorption, noise, and the like can be measured to determine flow rate and compositional characteristics of the fluid in the fluid channel.

One of the issues facing conventional acoustic interferometry approaches is that the interference of gas bubbles in the fluid with transmission of sound. Some conventional approaches attempt to lengthen the wavelength to a distance greater than the average gas bubble size in order to avoid gas bubble interference; however, the result has been that signals are confused with subsequent signals and accuracy of flow rate and compositional measurements decreases. For instance, as disclosed in U.S. 2018/0120269 (the entire contents of which as are hereby incorporated herein by reference in their entirety) a longer wavelength sound wave, such as a chirp, or a sweep frequency transmission, may be used to interrogate a multiphase flowing liquid. This approach, however, requires computationally complex signal processing for disambiguation between different sound waves having different frequencies that may overlap at the receiver. In other words, conventional approaches typically require that a single frequency sound wave is transmitted followed by subsequent different single frequency sound waves. Each sound wave may be a chirp, and the frequency may be a sweep frequency, or a frequency that is "swept" between a low and high frequency, however each single frequency sound wave is interrogating a different cross-section of fluid flowing through the pipe, and signal overlap at the receiver requires costly and time-consuming disambiguation by a high-capacity and costly digital signal process (DSP) or computer.

According to conventional approaches such as the approach of U.S. 2018/0120269, pipe resonances can be measured using piezoelectric transducers attached to the outside surface of the pipe. One transducer may be used to excite resonances in the cavity, and a second transducer placed anywhere on the surface of the pipe may be used to detect the resonance and the shift therein. A function generator can be used to drive a transmitter transducer, and the frequency varied to locate the actual resonance by using a receiver transducer as a detector. It may be necessary to amplify the receiver signal. A feedback circuit, such as a phase locked loop, can be used to track the resonance frequency and to determine fluid compositional characteristics.

In addition, conventional systems and apparatuses for carrying out these conventional approaches, such as the swept frequency acoustic interferometry (SFAI) approach, are also disclosed in U.S. 2018/0120269. For instance, FIG. 1 is a schematic representation of an embodiment of a non-invasive device, 10, for measuring compositional characteristics and the like in a fluid-filled pipe. Transducers, 12 and 14, made from piezoelectric materials, for example PZT-4, are mounted on external surface, 16, of pipe, 18, and in acoustic contact therewith, transducer, 12, acting as the transmitting source (T) and transducer, 14, as a receiving element (R). The transmitter transducer, 12, is energized by applying a frequency chirp voltage signal of a fixed duration (anywhere between 1-20 ms) from an arbitrary waveform generator (AWG), 22, and this in turn excites mechanical resonances in the pipe. The AWG has a 50 MHz output frequency range. The receiver transducer, 14, detects the mechanical resonances in the pipe and converts the vibration signal into a voltage signal. The transducers can be mounted almost anywhere on the pipe and can be mounted on any orientation azimuthally or on any location on the pipe. These can be vertically displaced or can be on the same side of the pipe or the opposite side of the pipe. Transducers may be mounted on the same side of the pipe, but vertically displaced. This is possible because the resonance vibration of the entire pipe section is being monitored, and the resonance frequency is the same everywhere along the length of the pipe. However, FIG. 1 shows the transducers mounted on opposite sides of the pipe.

The transducers can also be non-contact types, such as electromagnetic acoustic transducer (EMAT) or any other transducers capable of exciting the pipe resonances and detecting those resonances, including a laser or capacitive vibration sensing device. Central computer or digital signal processor (DSP), 20, selects chirp frequencies as input to arbitrary waveform generator (AWG), 22, and controls its functioning. The detected resonance vibration signals by receiver, 14, are amplified and band-pass filtered by combined amplifier-filter electronic module, 24, and digitized using 12 bit, 25 MHz A/D converter, 26, for input to DSP or computer, 20. The band-pass filter is used to filter out any extraneous vibration (e.g., ambient vibration) beyond the frequency range that is used in the frequency chirp. This improves the quality of the signal and makes the measurement relatively immune to ambient vibrations that are typically less than 10 kHz in most oil-field locations. The electrical output, 8, of the AWG, 22, is also fed to an analog-to-digital converter (ADC), 26, and simultaneously digitized. DSP 20, uses both these input signals to the ADC, 26, to demodulate the amplitude variations to extract the variation in amplitude over time, and uses a frequency transform of the demodulated amplitude information to obtain a frequency spectrum using a Fast Fourier Transform (FFT) to analyze the frequency spectrum of the signals to calculate the shift in peak frequency or variation in amplitude root-mean-squared (RMS) value. The shift in peak frequency and the change in peak amplitude are functions of the internal contents (e.g., fluid+gas) of pipe, 18. Graphics display, 28, is used to provide visual output for DSP or computer, 20.

Figure 2A:
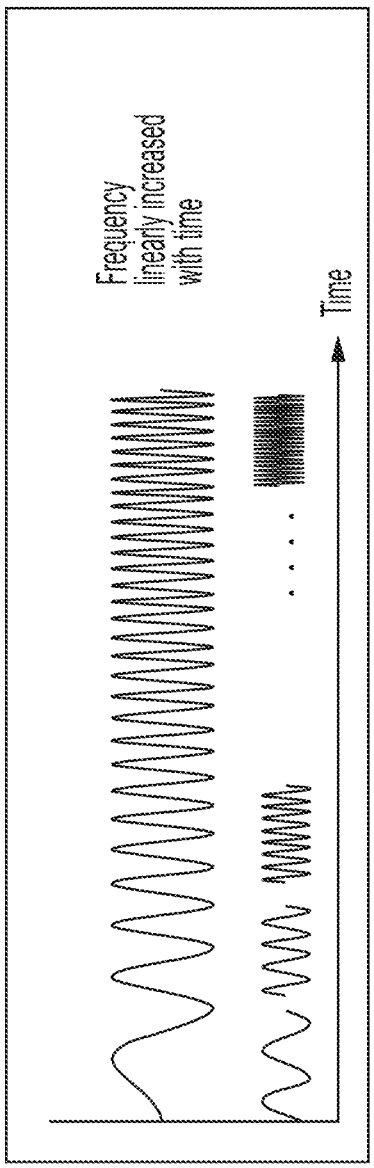
FIG. 2A is a graph of a non-pulse waveform according to the swept frequency acoustic interferometry (SFAI) technique.

As such, conventional approaches such as the SFAI approach includes a sweep frequency transmission of sound waves transmitted through the fluid. In some embodiments, the SFAI technique may comprise varying the frequency slowly, thereby allowing each frequency to reach a steady state such that appropriate frequencies have the chance to establish resonance of the pipe or material therewithin over a relatively long duration. As illustrated in FIG. 2A, the waveform may take on a Gaussian shape and have a frequency that increases linearly with time and interrogates the fluid at a single frequency at a time with a large wavelength.

Figure 3:
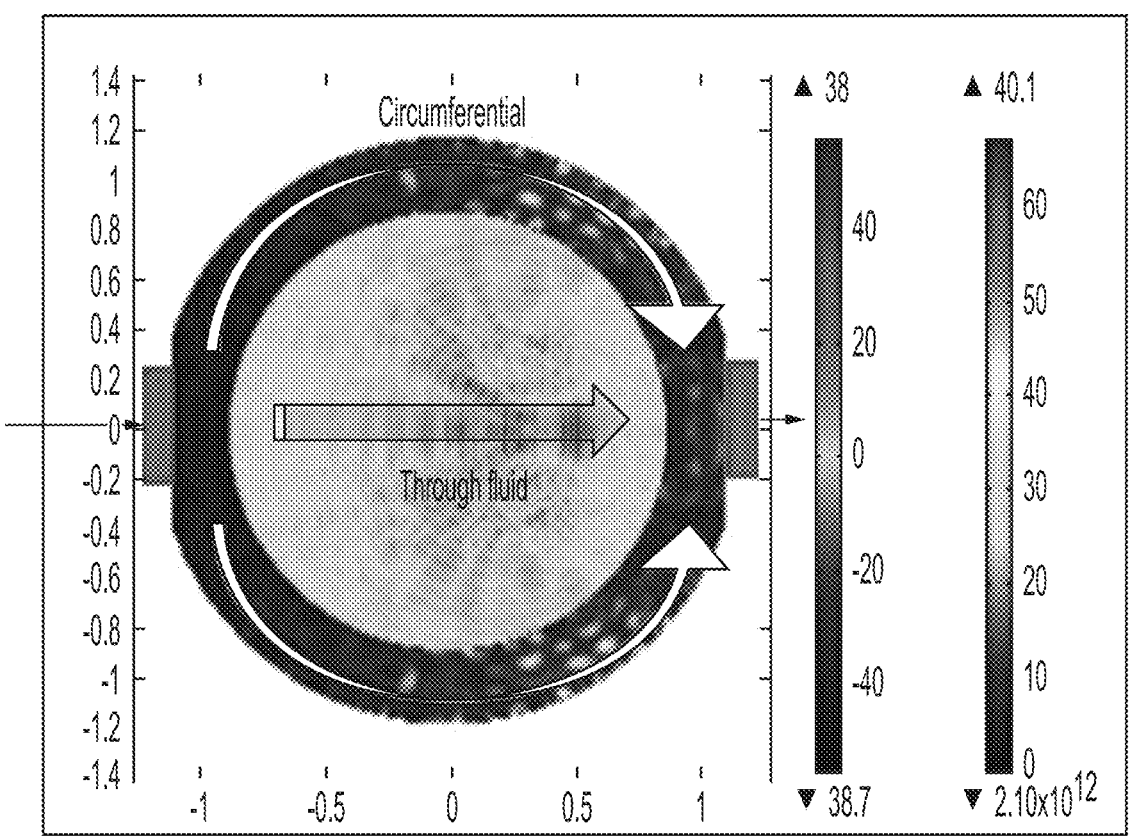
FIG. 3 illustrates dual path sound propagation in a fluid transport pipe, according to an embodiment of the current disclosure.

Another concern related to measuring flow rate and the like using conventional acoustic interferometry approaches may include that, according to many conventional approaches, sound waves tend to have a duration and wavelength that is long enough such that circumferential sound waves from subsequent chirps reach the receivers about the same time that present sound waves traveling through the multiphase fluid reach the receivers. Likewise, acoustic reverberation or sound wave reflections may also reach a receiver about the same time that subsequent acoustic waves reach the receiver, which can lead to signal convolution. In other words, it can be quite difficult, using conventional approaches, equipment, and settings, to distinguish between noise (e.g., circumferential sound waves) and sound waves that have properly traveled through the multiphase fluid in the pipe. This phenomenon is illustrated in FIG. 3, which illustrates that sound waves can be transmitted about the pipe or through the pipe circumferential to a multiphase fluid flowing through the pipe in addition to being transmitted through the multiphase fluid itself. Since the circumferential sound waves from a second portion of a chirp may arrive at a receiver at the same time as the sound waves from a first, prior portion of the chirp that travel through the multiphase fluid, the overlap in arriving sound waves often results in convoluted signals.

Figure 4:
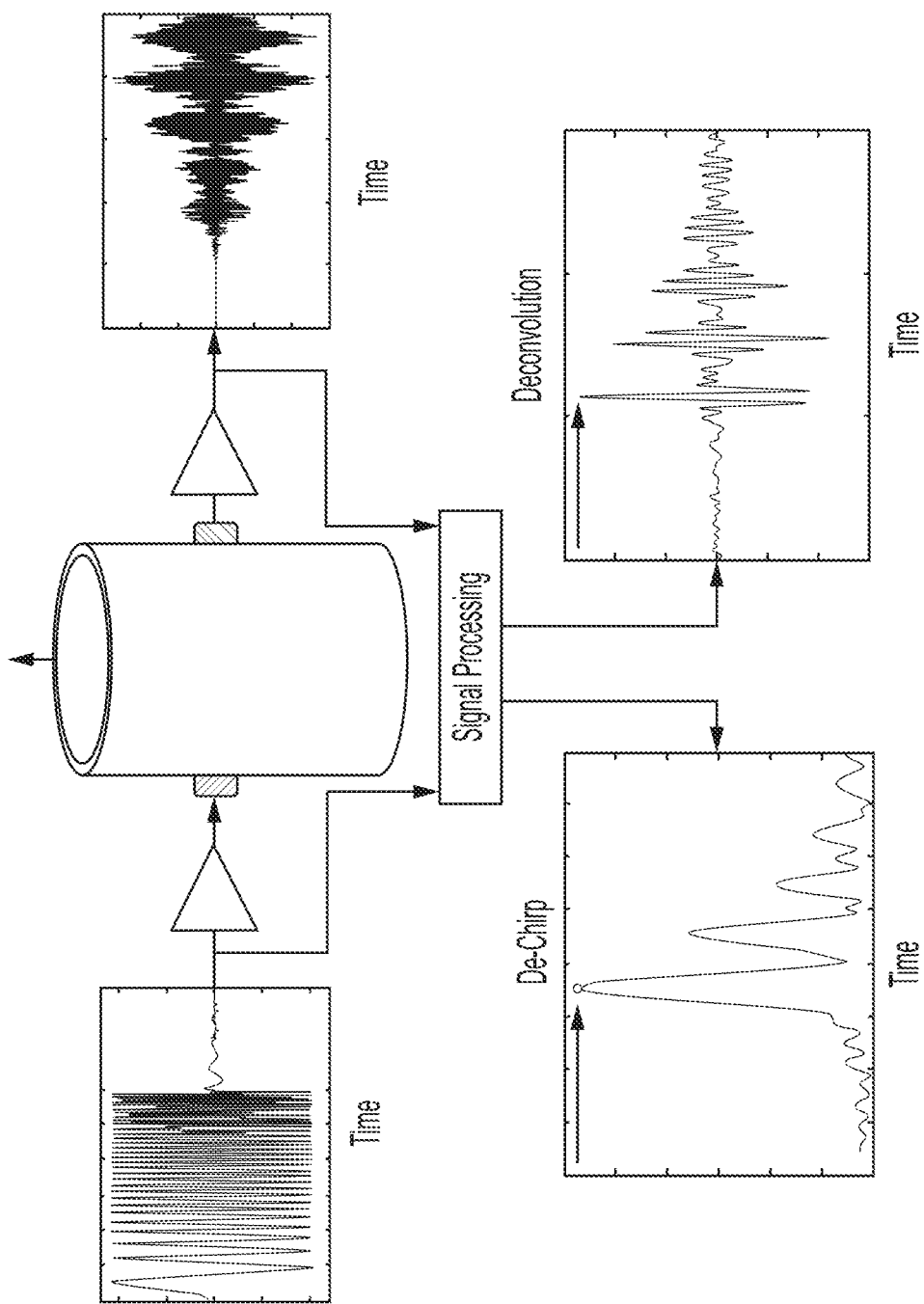
FIG. 4 is a schematic representation of an embodiment of a SFAI measurement apparatus, according to an embodiment of the current disclosure.

As such, conventional approaches, such as the SFAI approach, may require signal processing such as de-chirp or deconvolution, such as illustrated in FIG. 4, to be able to interpret fluid properties such as flow rate, density, compositional information, and the like from the received, convoluted signal. According to some conventional approaches, a AWG, surface acoustic wave (SAW) device, voltage-controlled oscillator, DSP, digital to analog converter (DAC), direct digital synthesizer (DDS), combinations thereof, or the like may be used to generate and/or de-chirp the sweep signal or chirp signal. Additionally or alternatively, an algorithm-based deconvolution approach or the like may be carried out by a processor to reverse the effects of convolution, whether intentional or unintentional from transmitted sound waves at varying frequencies reaching receivers via different pathways and at different times. While such deconvolution approaches can be helpful for increasing the accuracy of measurements using the SFAI approach, it is typically a computationally complex and costly process.

While the SFAI approach may result in increased accuracy of measured compositional information and flow rate for high gas bubble content fluids, this approach requires computationally complex, costly, and time-consuming signal processing (e.g., de-chirp, deconvolution, and the like).

As such, there remains a need for an acoustic interferometric approach that can interrogate a fluid at shorter time intervals, avoid the gas bubble interference problem, cross-correlate amplitude with time of flight and sound speed, reduce the equipment costs of in situ acoustic interrogation of fluids, and decrease or eliminate completely the need for signal processing and deconvolution processes.

Disclosed generally herein are approaches, methods, apparatuses, and systems for forming shaped acoustic signal waveforms for interrogation of multiphase fluids, referred to herein as shaped waveform interrogation of fluids techniques (SWIFT). In contrast to the SFAI technique and other techniques, such as those disclosed in U.S. 2018/0120269, which rely upon serial interrogation of fluids by different single-frequency acoustic signals such as Gaussian chirps and swept frequency transmissions, at least some of the disclosed SWIFT approaches and embodiments described herein comprise generating (e.g., summing) the frequencies of at least some wave forms from some or all of the relevant acoustic signals to form a single shaped waveform, e.g., comprising a Gabor waveform or the like, with a predetermined frequency content (e.g., bandwidth, frequency band, etc.) the acoustic wave being transmitted in a very short duration burst or pulse of acoustic signal. In some embodiments, the predetermined frequency content may include frequencies between about 10 kHz and about 50 MHz.

For instance, in some embodiments, one or more transmitters may be positioned on a first side of a fluid-filled pipe and one or more receivers may be positioned on a second side of the fluid-filled pipe, and an arbitrary waveform generator or the like may be caused to generate a pulse having a short duration or a short period, e.g., a single approximately 5 µs duration acoustic wave, based upon the combined (e.g., summed) waveforms of a variety of applicable wave forms (e.g., Sinc). In some embodiments, the one or more transmitters may transmit the acoustic wave through the first wall of the pipe, through the multiphase fluid, through the second wall of the pipe, and to the one or more receivers. The one or more receivers may receive first circumferential modes and the various signal noise attributable to sound waves transmitted from the one or more transmitters, through the pipe itself, and to the one or more receivers. The sound waves traveling circumferentially through the pipe tend to encounter less interference than sound waves traveling through the multiphase fluid, which means that the circumferential sound waves reach the one or more receivers before the sound waves that travel through the multiphase fluid. Conventional approaches typically require deconvolution and signal processing because the sound waves have a duration and wavelength that is long enough such that circumferential sound waves from previous and/or subsequent sound waves reach the receivers about the same time that present sound waves traveling through the multiphase fluid reach the receivers. In other words, it can be quite difficult, using conventional approaches, equipment, and settings, to distinguish between noise (e.g., circumferential sound waves) and sound waves that have properly traveled through the multiphase fluid in the pipe. In contrast, according to some embodiments of the present disclosure, a single short duration acoustic wave, comprising all applicable wave forms summed together and having a predetermined frequency content, is transmitted through the fluid-filled pipe, which means that circumferential sound waves reach the receivers first followed a discernable time later by sound waves that have traveled through the multiphase fluid and sound waves that have reverberated off of the inside of the pipe and the like. Since the initial signal amplitude peaks associated with circumferential sound waves are clearly distinguishable from the later signal amplitude peaks associated with sound waves that have traveled through the multiphase fluid, no deconvolution or de-chirp processes, such as signal processing and computationally complex algorithmic deconvolution are required.

Figure 2B:
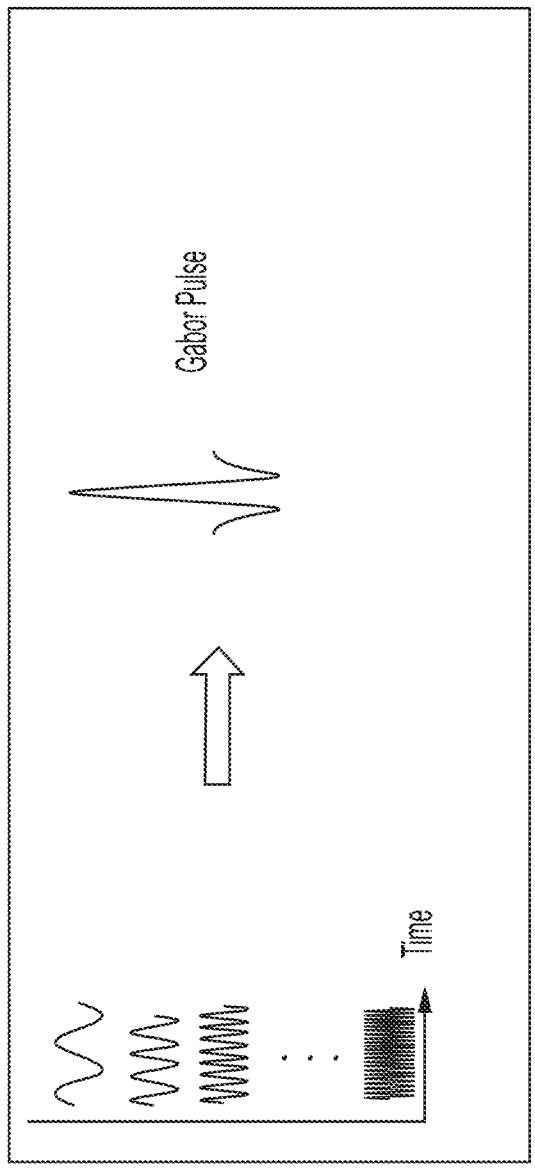
FIG. 2B is a graph of a pulse waveform according to the SWIFT, according to an embodiment of the current disclosure.

In contrast to the SFAI approach and the conventional swept frequency interrogation wave form and wavelengths as illustrated in FIG. 2A, the SWIFT approach employs a short duration pulse or similar wave forms, such as illustrated in FIG. 2B.

In some embodiments, a change in flow rate, density, composition, volume fraction, or the like of a fluid, or other substances or materials, may result in changes in a received sound wave. For instance, the time of flight, wavelength, frequency-dependent attenuation, or the like of the acoustic wave received at the receiving transducer(s) can change in accordance with changes in one or more fluid characteristics, such as flow rate, density, composition, volume fraction, solid loadings, or other fluid characteristics. In some embodiments, an initial value or calibration value of the one or more fluid characteristics can be determined experimentally for the particular multiphase fluid, substance, or material using analysis/monitoring device or system. For instance, in some embodiments in which the composition of the multiphase fluid does not change over time or only changes slightly over time, initial analysis of the time of flight (sound speed) of the acoustic wave through the multiphase fluid at various flow rates can provide a calibration curve. Then, in order to accommodate ongoing, real-time analysis and monitoring of flow rate of the multiphase fluid, the same acoustic wave can be transmitted through the multiphase fluid in an ongoing or iterative basis, and flow rate can be determined at least by comparison of the time of flight (sound speed) to the calibration curve.

In some embodiments, e.g., if fluid characteristics such as density, flow rate, and/or the like are known or unchanging, initial analysis can be conducted to determine the initial composition of the multiphase fluid, substance, or material and one or more interferometric characteristics of the acoustic wave through the multiphase fluid. Additionally or alternatively, the fluid characteristics (e.g., composition, gas volume fraction, solids loading, or the like) can be changed over time and likewise the interferometric characteristic(s) can be determined as the fluid characteristic(s) is(are) changed over time in order to establish a calibration curve. Following such analysis, ongoing or real-time analysis or monitoring of the fluid composition or other fluid characteristics can be carried out by comparison of the interferometric characteristic(s) at future times to the calibration curve. For instance, a multiphase fluid may comprise a gas-infused liquid in which the relative concentration of the gas in the fluid can be monitored by such analysis in real time.

In some embodiments, the SWIFT approach may be improved by initially knowing the different constituents in the fluid under investigation, while in some embodiments it may be unnecessary to have such prior knowledge of fluid, substance, or material composition or other characteristics. However, in some embodiments, knowing or determining the constituents or determining the constituents of the multiphase fluid, substance, or material during a calibration period or prior to initiating ongoing monitoring, and consequently knowing the physical properties (e.g. sound speed, density, sound attenuation, viscosity, etc.) of acoustic waves through the multiphase fluid, substance, or material, can help with determining the concentrations of some of the constituents in the fluid, substance, or material of interest during a later analysis or monitoring period.

In some embodiments, initial analysis of multiphase fluid composition, multiphase fluid flow rate, multiphase fluid density, and in those embodiments where a pipe or conduit is present (pipe material, pipe diameter, pipe wall thickness), or other characteristics of the system may be helpful, but are optional aspects of the SWIFT approach.

In some embodiments, physical or interferometric properties of sound waves can include, but are not limited to, waveform, frequency, pulse duration, amplitude, sound speed, attenuation, time of flight, or the like. In some embodiments, such properties of sound waves, such as the initial waveform or shaped waveform and frequency content (e.g., spectrum, bandwidth, etc.) of an initial acoustic wave or acoustic pulse can be selected based upon characteristics of the multiphase fluid. In some embodiments, a summed waveform can be selected based upon known characteristics of the fluid (e.g., based upon the particular multiphase fluid, the application, experimental results, data from the calibration period, etc.). In some embodiment, particular waveforms can be selected for the summed waveform pulse by applying a handful of different acoustic waves having different wave forms and determining how changes in particular fluid characteristic can lead to changes in physical properties of the acoustic wave transmitted therethrough. For instance, the wavelength, frequency, amplitude, time of flight, sound speed, attenuation, or the like may change in accordance with changes in one or more fluid characteristics.

In some embodiments, selecting a certain waveform or set of waveforms for a summed waveform acoustic wave can be based upon at least one or more of fluid and pipe material, composition, density, flow rate, degree of homogeneity, turbulence, viscosity, hydrodynamic shearing effects, number and type of components, and the like. In some embodiments, sound wave characteristics may comprise one or more of: attenuation, sound speed, modulation, acoustic impedance, acoustic contrast factor, and the like.

Figure 5:
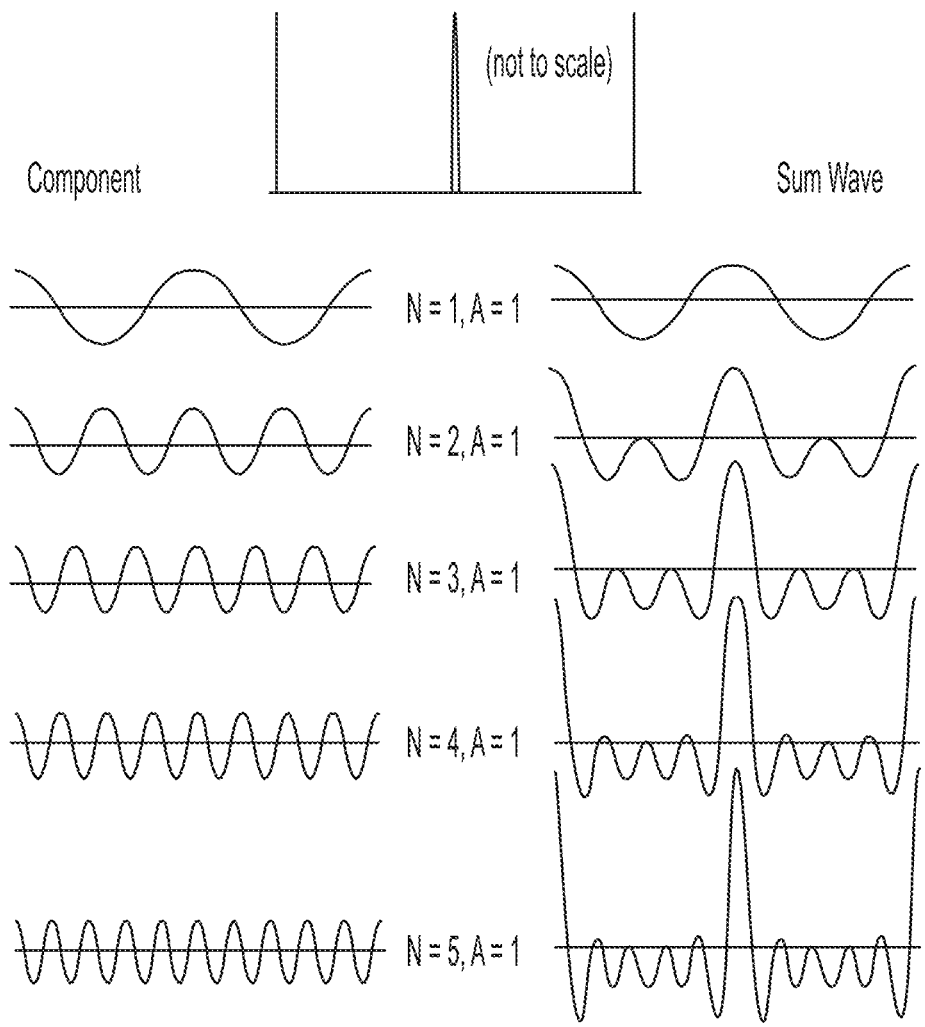
FIG. 5 is a graph of an approach for summing component waveforms to form a shaped waveform acoustic wave, according to an embodiment of the current disclosure.

As illustrated in FIG. 5, a sum of multiple waveforms can result in a single pulse of sound waves comprising all applicable frequencies. In addition to the summing of various pulse shapes, there are various particular waveforms that can be helpful in more accurately interrogating the multiphase fluid to determine flow rate, compositional information, fluid density, attenuation, and the like. Such acoustic waves comprising shaped waveforms can include, e.g., Gabor waveforms, cardinal sine functions, Sinc, squared hyperbolic secant functions, $Sech^2$, raised-cosine filter, gaussian filter, square shaped, triangle shaped, ramp up, ramp down, half sine, arbitrary, or the like. In some embodiments, the shaped waveform of the acoustic wave can comprise very similar content to a frequency chirp, such as used in SFAI, but a shorter duration, a Gaussian shape, and summed waveforms. In embodiments, the shaped waveform, consists of a short duration pulse, with a large and well-defined bandwidth, and a prescribed envelope/modulation. In some embodiments, such shaped waveform acoustic pulses may be usable for shaped waveform interrogation of a wide variety of substances and materials, such as multiphase fluids, fluids comprising gas such as gas bubbles at a concentration of up to about 50 vol %, and/or the like.

Conventional chirps and sweep signals, as opposed to the pulses described herein, cannot be shortened to such a short duration because frequency content from the chirp would need to be eliminated to artificially shorten the duration of the chirp. As such, even where the final, deconvoluted and/or de-chirped signal may look the same as the pulses disclosed herein (e.g., Gabor pulse and the like), each received chirp comprises only a single frequency per duration and the chirp is de-chirped during signal processing and is thus more computationally complex, time consuming, costly, and less accurate (at least since each frequency wave form is interrogating a different aliquot of flowing multiphase fluid).

In some embodiments, based on the pulse duration being so short, between about 100 and about 1,000 measurements of the multiphase fluid can be carried out per second without requiring de-chirp or deconvolution, as required by the conventional approaches such as SFAI.

Figure 6A:
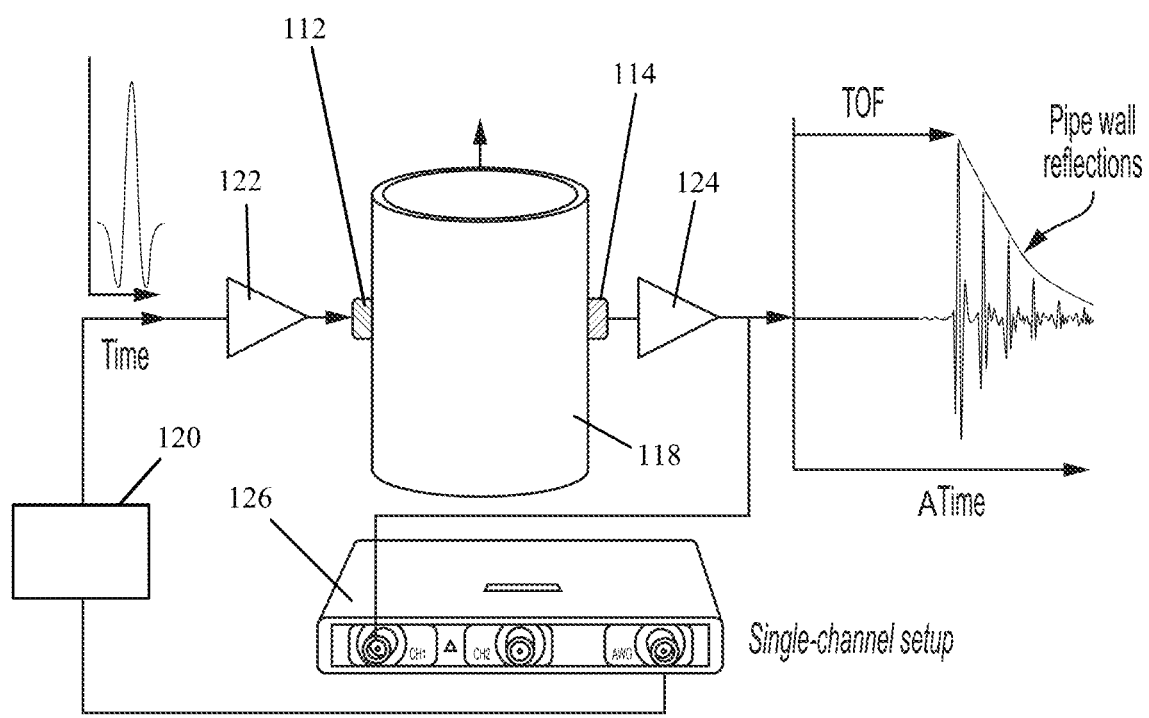
FIG. 6A is a schematic representation of an embodiment of a SWIFT measurement apparatus, according to an embodiment of the current disclosure.
Figure 6B:
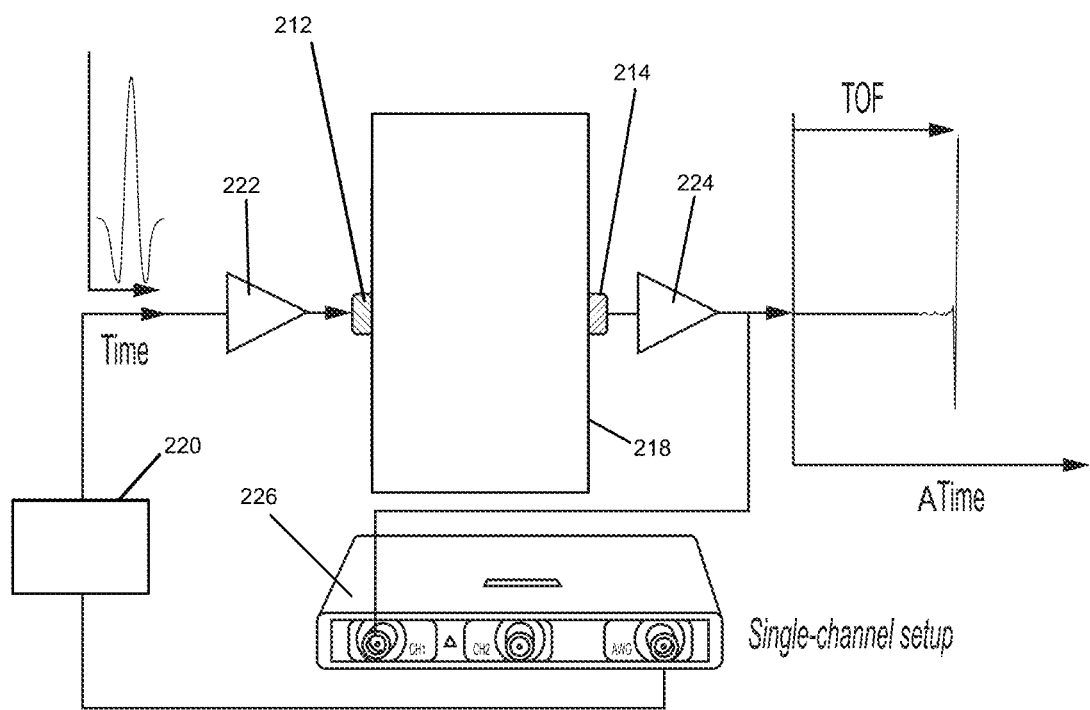
FIG. 6B is a schematic representation of an embodiment of a SWIFT measurement apparatus, according to another embodiment of the current disclosure.

In contrast to the system and apparatus typically used for carrying out the SFAI approach, such as illustrated in FIG. 4, systems or apparatuses for carrying out the SWIFT approach, according to some embodiments, are illustrated in FIGS. 6A and 6B. In some embodiments, as illustrated in FIG. 6A, the apparatus or system can comprise one or more transmitter transducers (referred to herein also as "transmitters"), such as a transmitter transducer, 112, and receiver transducers (referred to herein also as "receivers"), such as a receiver transducer, 114. In some embodiments, the transmitters and receivers can be mounted on opposite sides of a pipe, such as pipe, 118, as shown in FIG. 6A. While the apparatus is illustrated in FIG. 6A as including a single transmitter transducer 112 and a single receiver transducer 114, the apparatus can alternatively include more than one transmitter transducer 112 and more than one receiver transducer 114. As illustrated in FIG. 6A, the apparatus can further comprise a waveform generator 122 configured to generate the acoustic wave. In some embodiments, the apparatus can further comprise a signal filter 124 configured to convert a signal received from the receiver transducer 114 in accordance with the acoustic wave after transmission through the substance or material. In some embodiments, the apparatus can further comprise a signal processor 126, such as a single-channel setup. In some embodiments, the signal processor 126 is configured to process the signal for interpretation to calculate one or more signal characteristics of the acoustic wave after transmission through the material or substance. In some embodiments, the apparatus can further comprise a computing device 120 configured to initiate or carry out one or more of: waveform generation, transmission of the acoustic wave by the transmitter transducer 112, receipt of the acoustic wave by the receiver transducer 114, formation of a signal from the receiver transducer 114 to the signal filter 124 and/or the signal processor 126, and determination of the one or more signal characteristics of the acoustic wave once transmitted through the material or substance, and the like. In some embodiments, the computing device 120 is further configured to determine, based on the one or more signal characteristics of the acoustic wave received at the receiver transducer 114, one or more characteristics of the substance or material.

FIG. 6B illustrates an embodiment of another system that may be used to carry out the SWIFT approach on a substance that is not within a pipe or container. In some embodiments, as illustrated in FIG. 6B, the apparatus or system can comprise one or more transmitter transducers (referred to herein also as "transmitters"), such as a transmitter transducer, 212, and receiver transducers (referred to herein also as "receivers"), such as a receiver transducer, 214. In some embodiments, the transmitters and receivers can be mounted on opposite sides of a substance or material 118, as shown in FIG. 6B. While the apparatus is illustrated in FIG. 6B as including a single transmitter transducer 212 and a single receiver transducer 214, the apparatus can alternatively include more than one transmitter transducer 212 and more than one receiver transducer 214. As illustrated in FIG. 6B, the apparatus can further comprise a waveform generator 222 configured to generate the acoustic wave. In some embodiments, the apparatus can further comprise a signal filter 224 configured to convert a signal received from the receiver transducer 214 in accordance with the acoustic wave after transmission through the substance or material. In some embodiments, the apparatus can further comprise a signal processor 226, such as a single-channel setup. In some embodiments, the signal processor 226 is configured to process the signal for interpretation to calculate one or more signal characteristics of the acoustic wave after transmission through the material or substance. In some embodiments, the apparatus can further comprise a computing device 220 configured to initiate or carry out one or more of: waveform generation, transmission of the acoustic wave by the transmitter transducer 212, receipt of the acoustic wave by the receiver transducer 214, formation of a signal from the receiver transducer 214 to the signal filter 224 and/or the signal processor 226, and determination of the one or more signal characteristics of the acoustic wave once transmitted through the material or substance, and the like. In some embodiments, the computing device 220 is further configured to determine, based on the one or more signal characteristics of the acoustic wave received at the receiver transducer 214, one or more characteristics of the substance or material.

In some embodiments, the acoustic wave can comprise a shaped waveform comprising a burst or pulse, e.g., a Gabor pulse. In some embodiments, the acoustic wave can be transmitted from the transmitter transducer to the receiver transducer, the acoustic wave having a duration of between about 0.1 µs and about 20 µs, about 0.1 µs and about 15 µs, about 0.1 µs and about 10 µs, about 0.1 µs and about 5 µs, a duration of about 5 µs, about 4 µs, about 3 µs, about 2 µs, about 1 µs, or about 0.1 µs, a duration of less than about 20 µs, about 19 µs, about 18 µs, about 17 µs, about 16 µs, about 15 µs, about 14 µs, about 13 µs, about 12 µs, about 11 µs, about 10 µs, about 9 µs, about 8 µs, about 7 µs, about 6 µs, about 5 µs, about 4 µs, about 3 µs, about 2 µs, about 1 µs, about 0.75 µs, about 0.5 µs, about 0.25 µs, or about 0.1 µs, a duration of greater than about 0.1 µs, about 1 µs, about 2 µs, about 3 µs, about 4 µs, about 5 µs, about 6 µs, about 7 µs, about 8 µs, about 9 µs, about 10 µs, about 11 µs, about 12 µs, about 13 µs, about 14 µs, about 15 µs, about 16 µs, about 17 µs, about 18 µs, about 19 µs, or about 20 µs, inclusive of all values and ranges therebetween. In some embodiments, the received signal can be transmitted from the receiver to a single-channel waveform sequencer or any other suitable equipment. In some embodiments, the waveform generator 122 or 222 can comprise a single-channel waveform sequencer may be capable of arbitrary (such as summed) wave generation according to 125 MS/s, can be configured for 10 digit sample clock frequency limited by 1 µS/s, 1 ppm clock accuracy and stability, occupying only a single slot, 14-bit vertical resolution, up to 100 MHz sine, 2 MBit memory depth, ultrafast waveform downloads, and/or the like. As opposed to the AWG and signal processing equipment typically required for conventional acoustic interferometry approaches, e.g., SFAI, which costs on the order of about $20,000 to about $35,000 or more and requires more energy use, the single-channel waveform sequencer can cost about $1,000 or less and requires on the order of about 2% of the energy of the AWG and signal processing equipment necessary for the conventional approaches. As such, there are significant cost and energy savings associated with the approaches, systems, and apparatuses disclosed herein.

Figure 7:
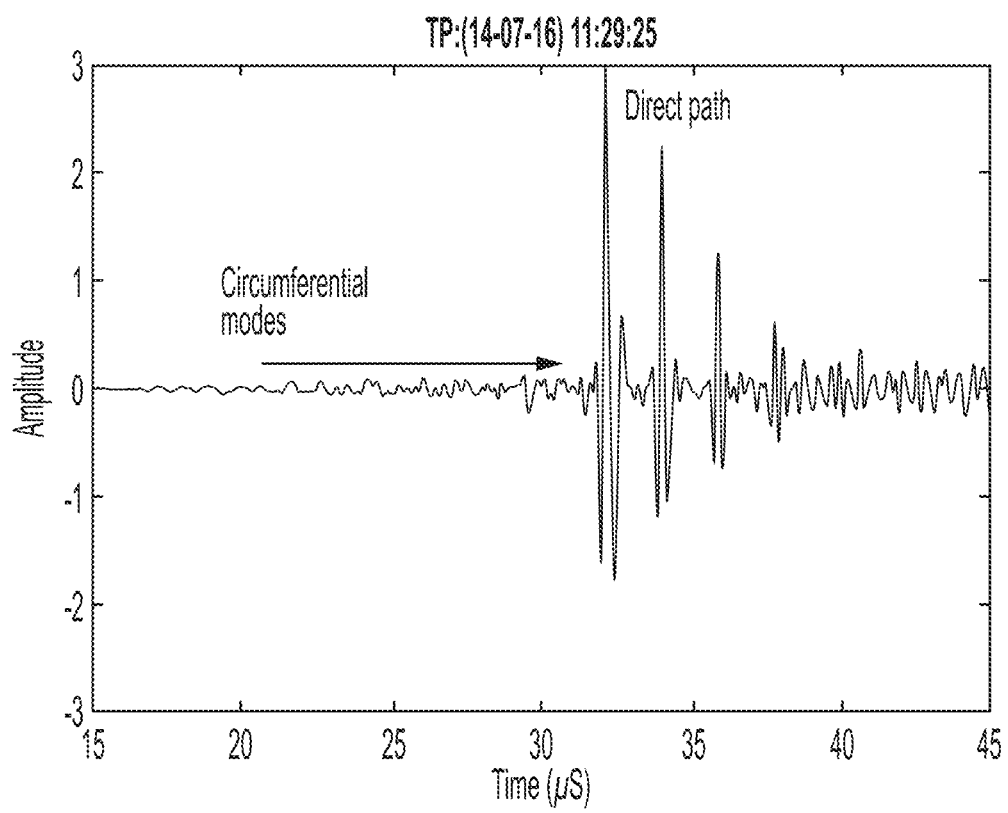
FIG. 7 is a graph of a measurement of a shaped acoustic waveform transmitted through a two-inch spool, according to an embodiment of the disclosure.
Figure 8:
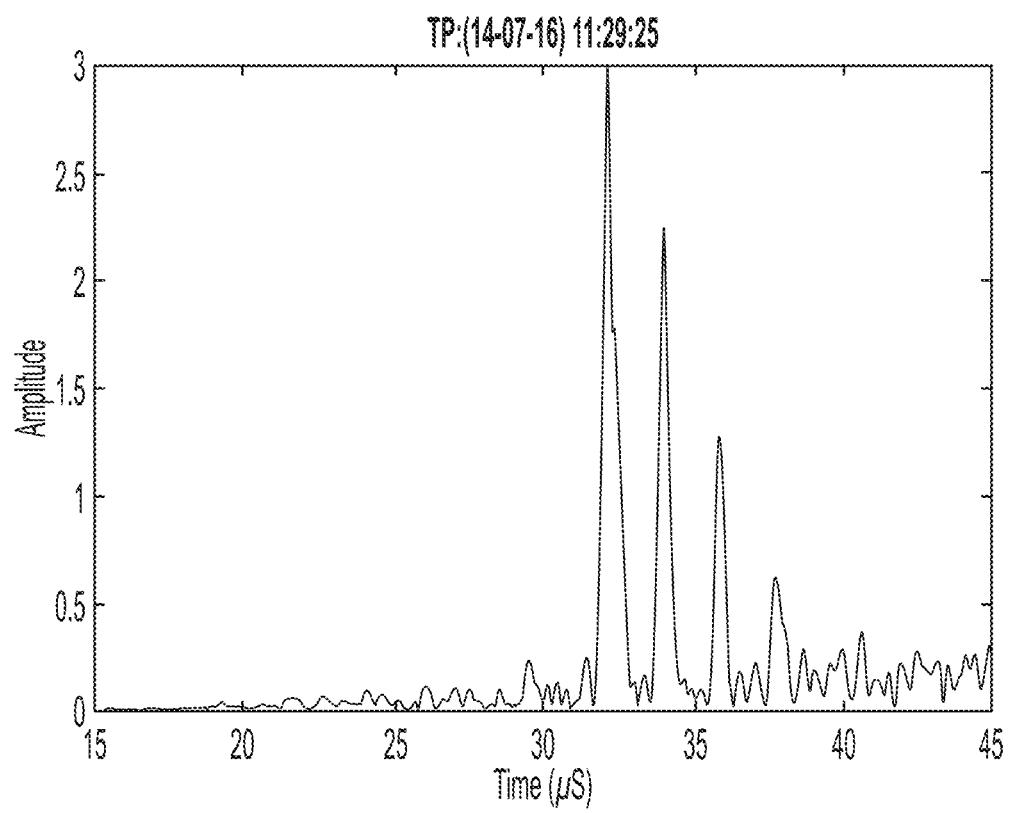
FIG. 8 is a graph of a transformed measurement of amplitude change over time of the shaped acoustic waveform illustrated in FIG. 7.

As illustrated in FIGS. 7 and 8, the directly received, raw signal data illustrated in FIG. 7 can be transformed, such as by signal processing, to the transformed signal data illustrated in FIG. 8. However, the raw signal data in FIG. 7 is clearly sufficient for distinguishing between circumferential mode sound waves on the left side of the graph and fluid interrogation sound waves on the right side of the graph in those embodiments where the fluid is within a conduit or container. As such, while signal processing may be helpful to clean up the graph and reduce noise caused by circumferential sound waves, it often is not necessary in order to sufficiently interrogate the multiphase fluid.

Figure 15A:
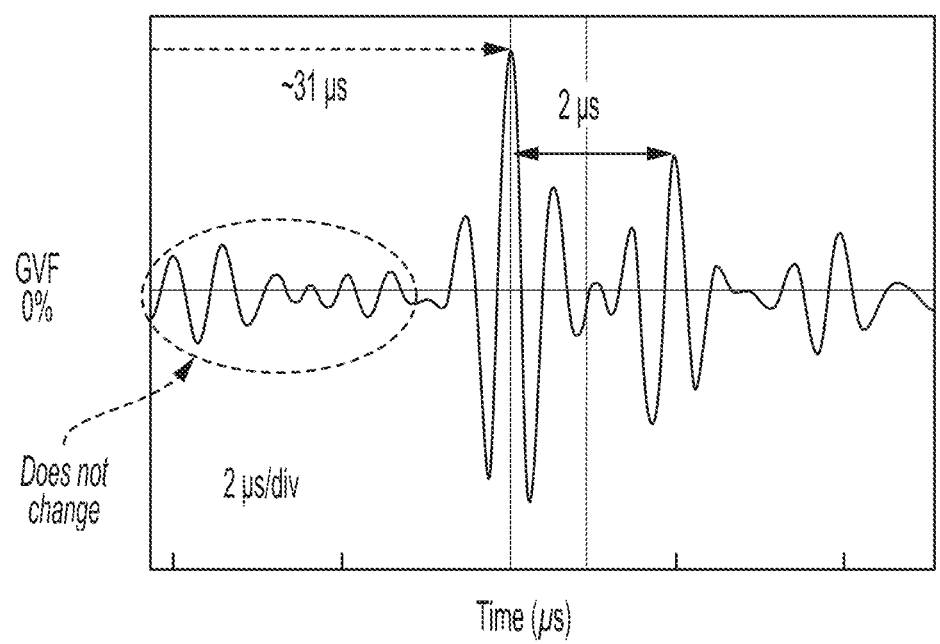
FIG. 15A-15D are graphs of sound speed data for a shaped waveform acoustic wave directed through different fluid compositions based on differences in ambient pressure and temperature, according to embodiments of the disclosure.
Figure 15B:
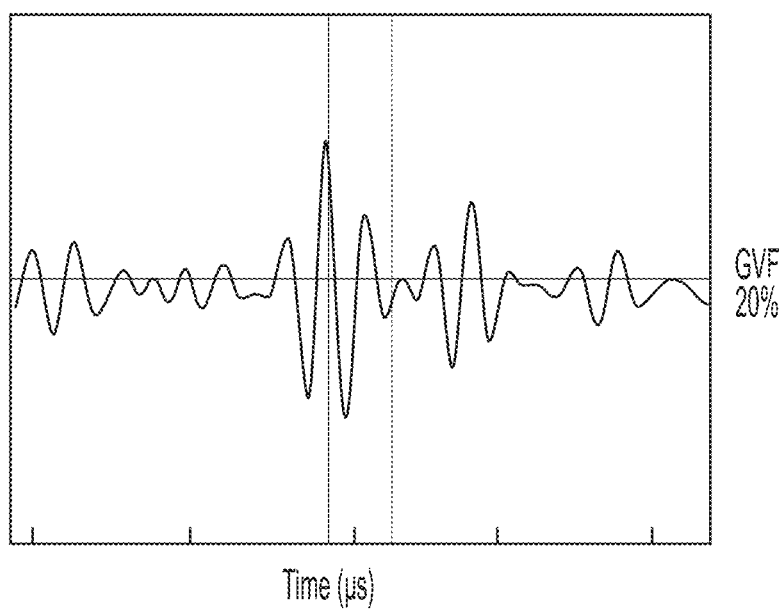
Figure 15C:
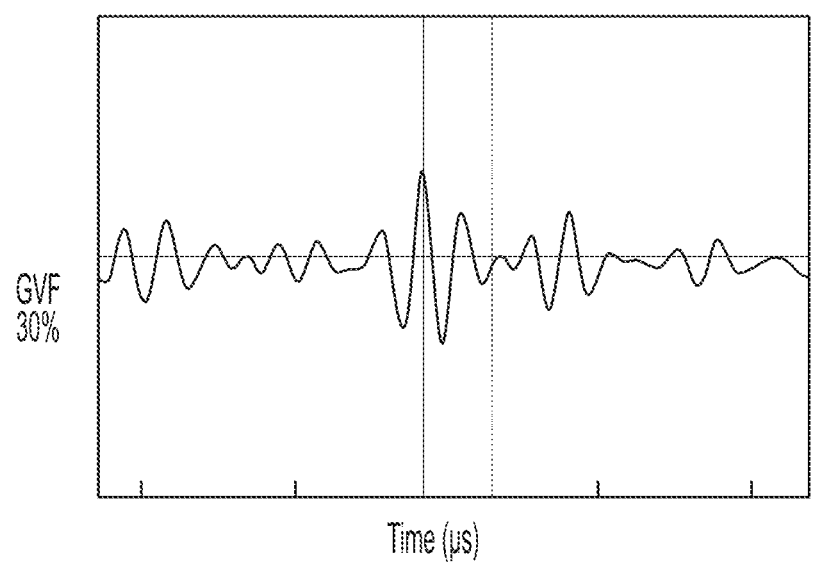
Figure 15D:
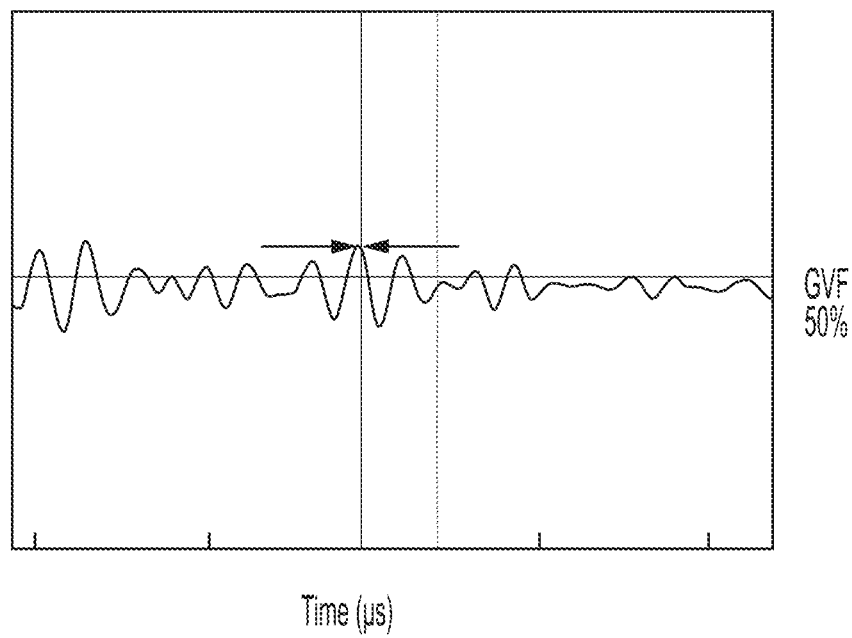
Figure 16:
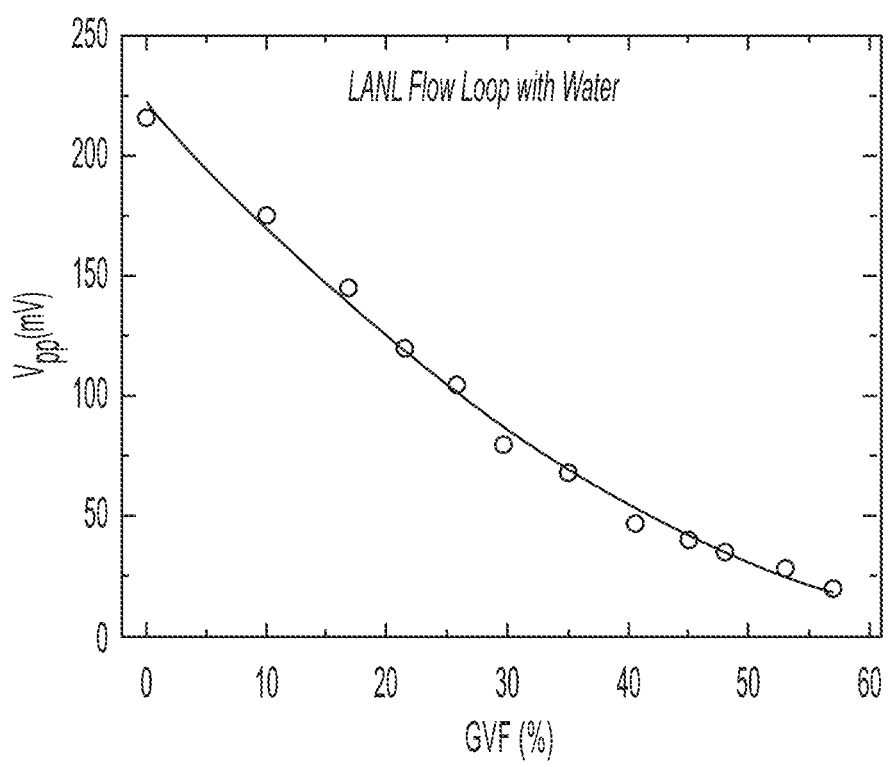
FIG. 16 is a graph of averaged received signal sound speed and amplitude versus gas volume fraction, according to an embodiment of the disclosure.

Some of the possible applications, such as those described in greater detail in U.S. 2018/0120269, for the SWIFT approach can include but are not limited to monitoring oil and gas applications, water treatment facilities, chemical manufacturing facilities, pulp and paper manufacturing, biomedical and healthcare applications, pharmaceutical applications, and the like. Following are examples from an oil and gas application, however embodiments of the present disclosure may be used in any suitable application and as noted above, are not limited to use on liquids, fluids, or materials within a pipe or container. For example, described herein and illustrated for instance in FIGS. 15A-15B is a series of observations from crude oil/water mixtures over a limited range of the observed frequency spectra of the received signal that was detected by the receiver transducer at different gas volume fraction (GVF) values, illustrating that GVF can be measured from the amplitudes of the received signals. As illustrated in FIG. 16 for instance, the overall amplitude of the spectra may decrease with increased GVF.

Figure 9A:
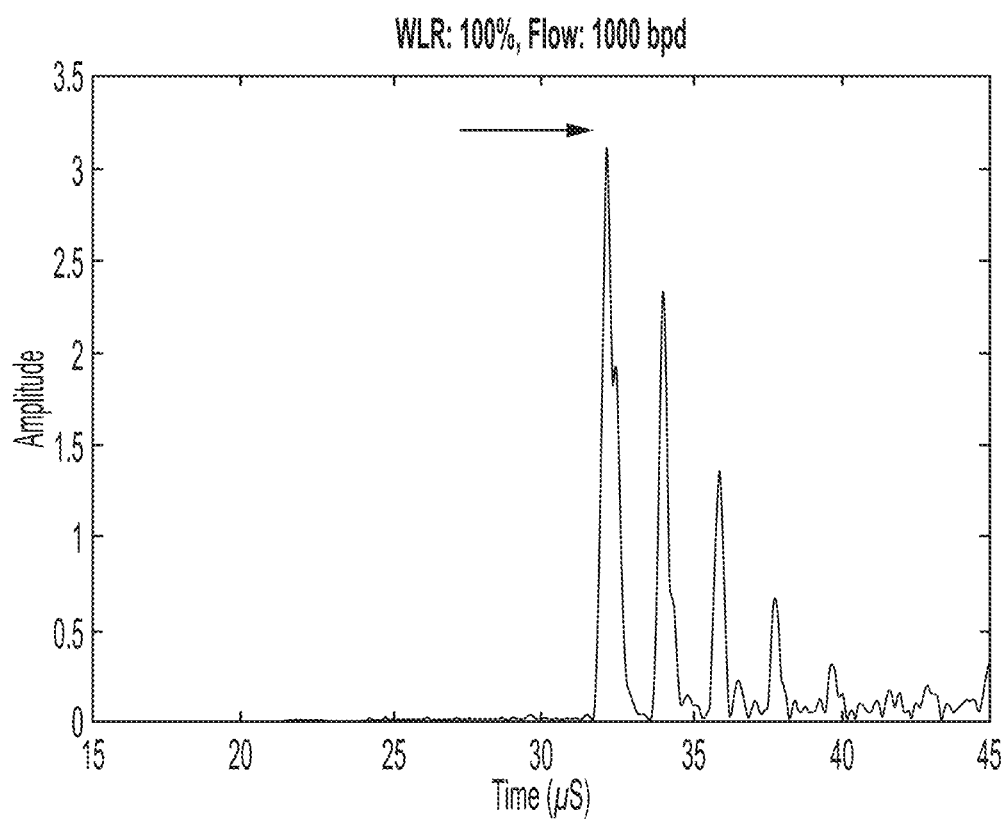
FIGS. 9A-9D are graphs of SWIFT measurements at different water-cuts and fluid flow rates for various oil production scenarios, according to embodiments of the disclosure.
Figure 9B:
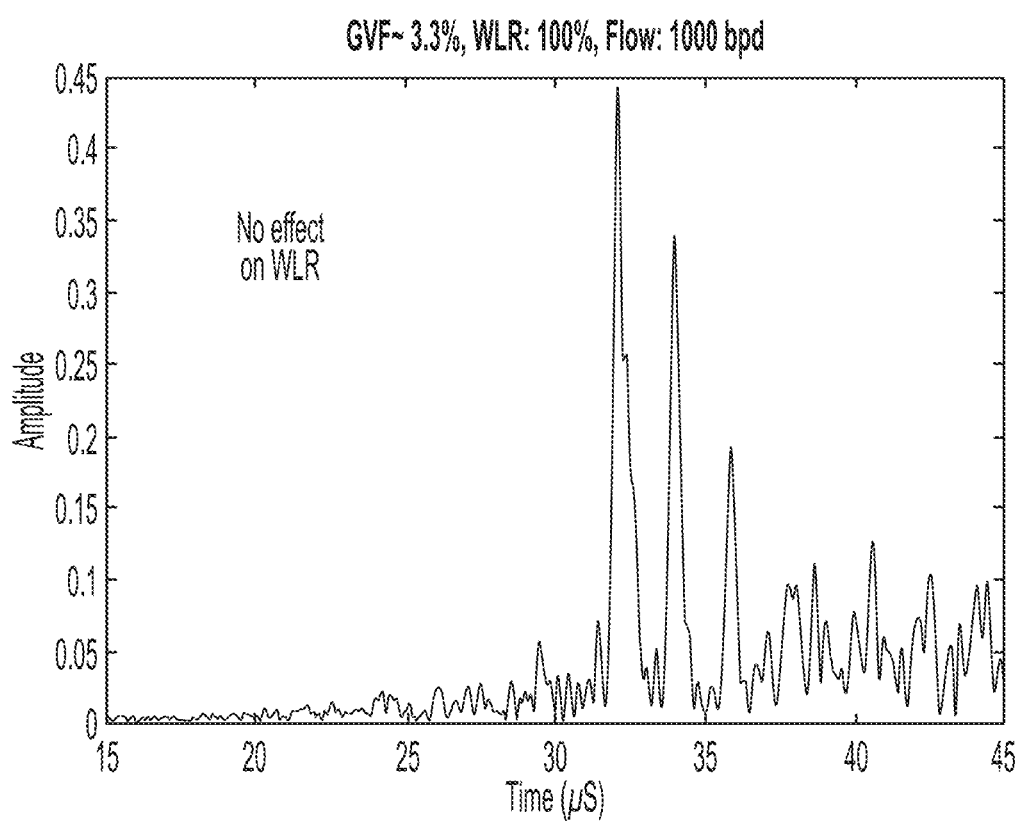
Figure 9C:
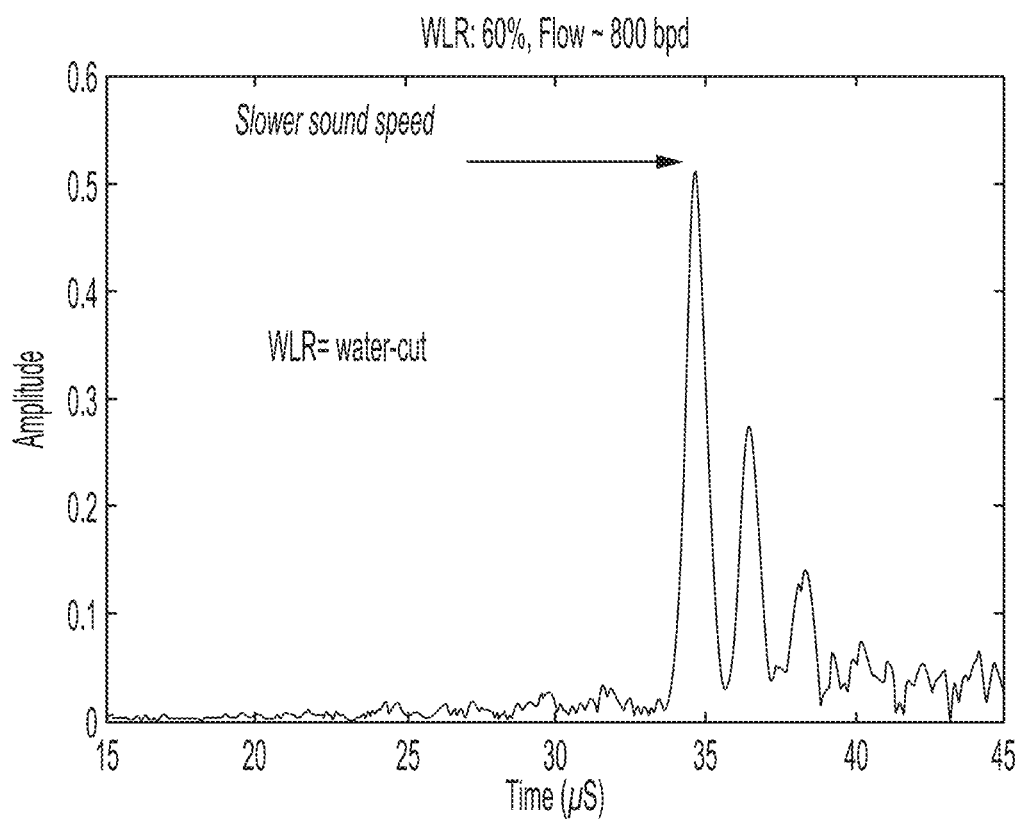
Figure 9D:
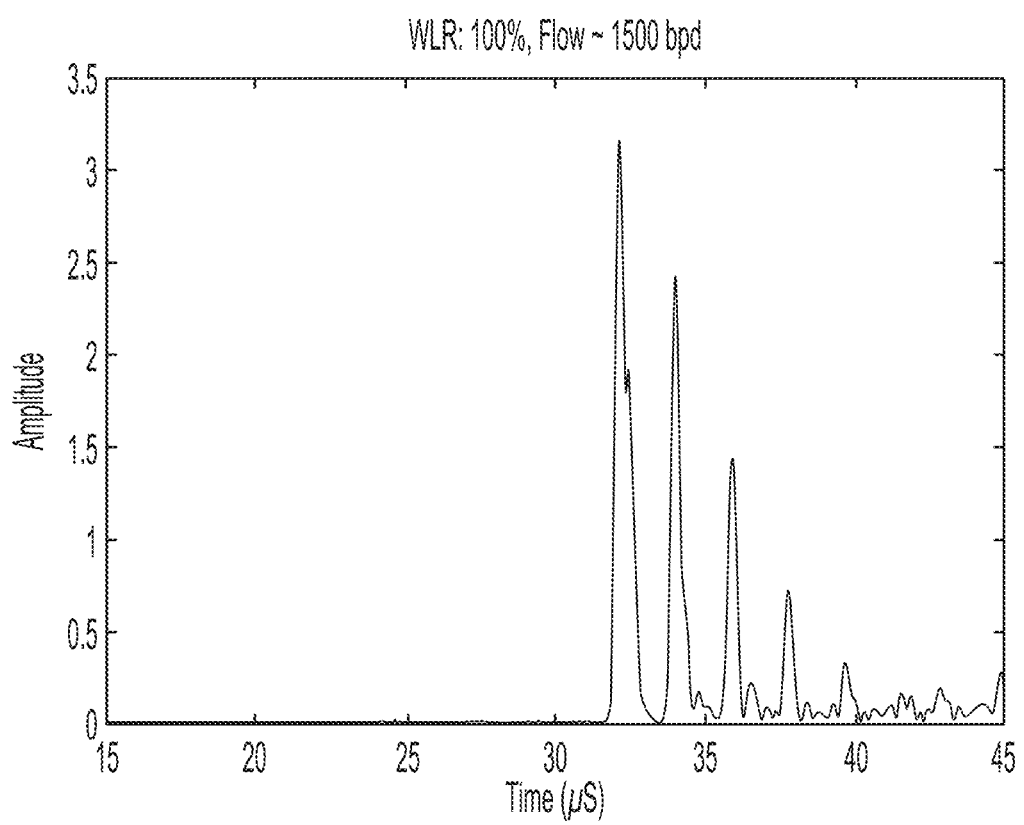

Referring now to FIGS. 9A-9D, received sound waves are graphically illustrated for a multiphase fluid comprising water and oil from various oil production well scenarios. As illustrated in FIG. 9A, for a 1,000 barrel per day (bpd) production well having an output water-cut (WLR) of 100%, a time to first fluid interrogation peak is about 33 µs. As illustrated in FIG. 9B, a 1,000 bpd production well having a WLR of 100% and a GVF of about 3.3% has a first fluid interrogation peak also at about 33 µs. Alternatively, as illustrated in FIG. 9C, an approximately 800 bpd production well having a WLR of about 80% has a first fluid interrogation peak shifted out to about 35 µs, meaning the fluid has a slower sound speed. As illustrated in FIG. 9D, a 1,500 bpd production well having a WLR of 100% also has a first fluid interrogation peak at about 33 µs, indicating that production rate (flow through pipe) and the like have less to do with sound speed than WLR.

Figure 10A:
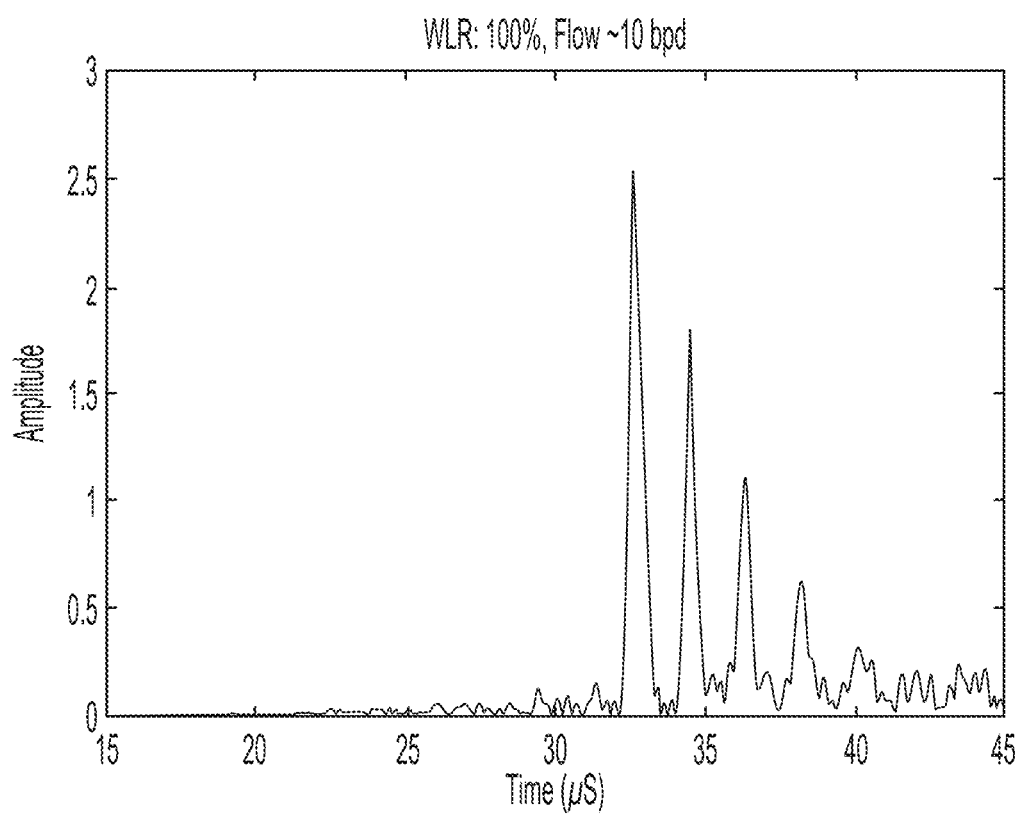
FIGS. 10A-10C are graphs of SWIFT measurements at different water-cuts and fluid flow rates for various oil production scenarios, according to embodiments of the disclosure.
Figure 10B:
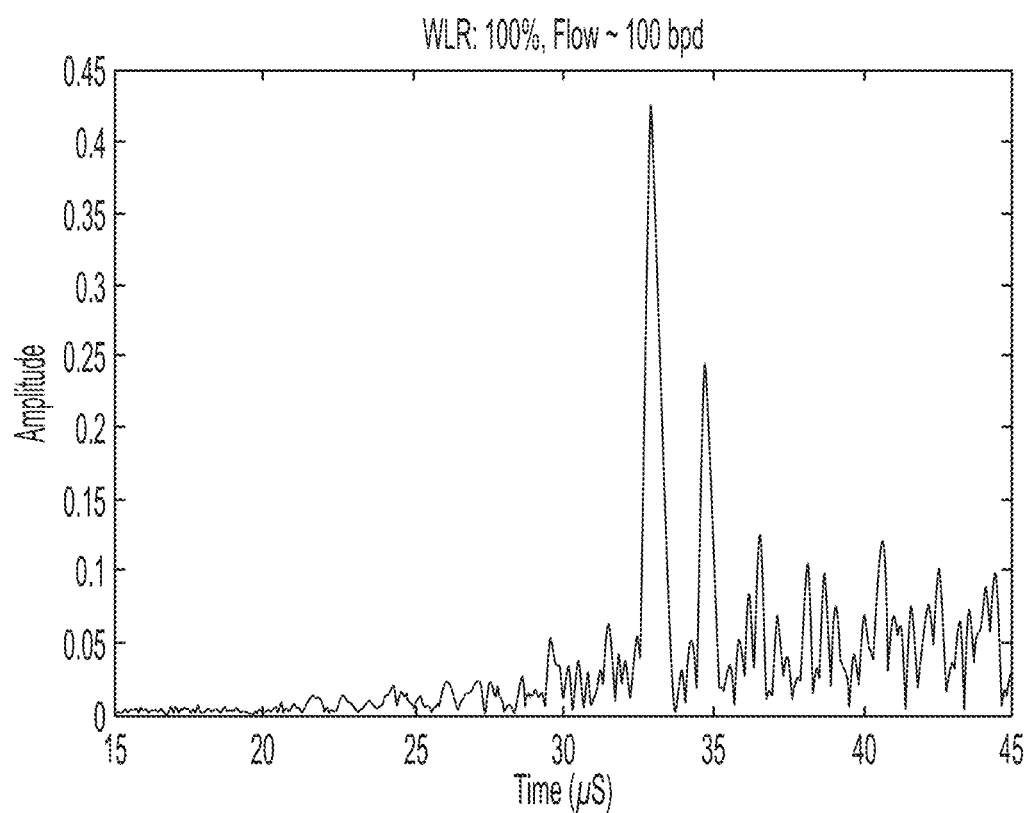
Figure 10C:
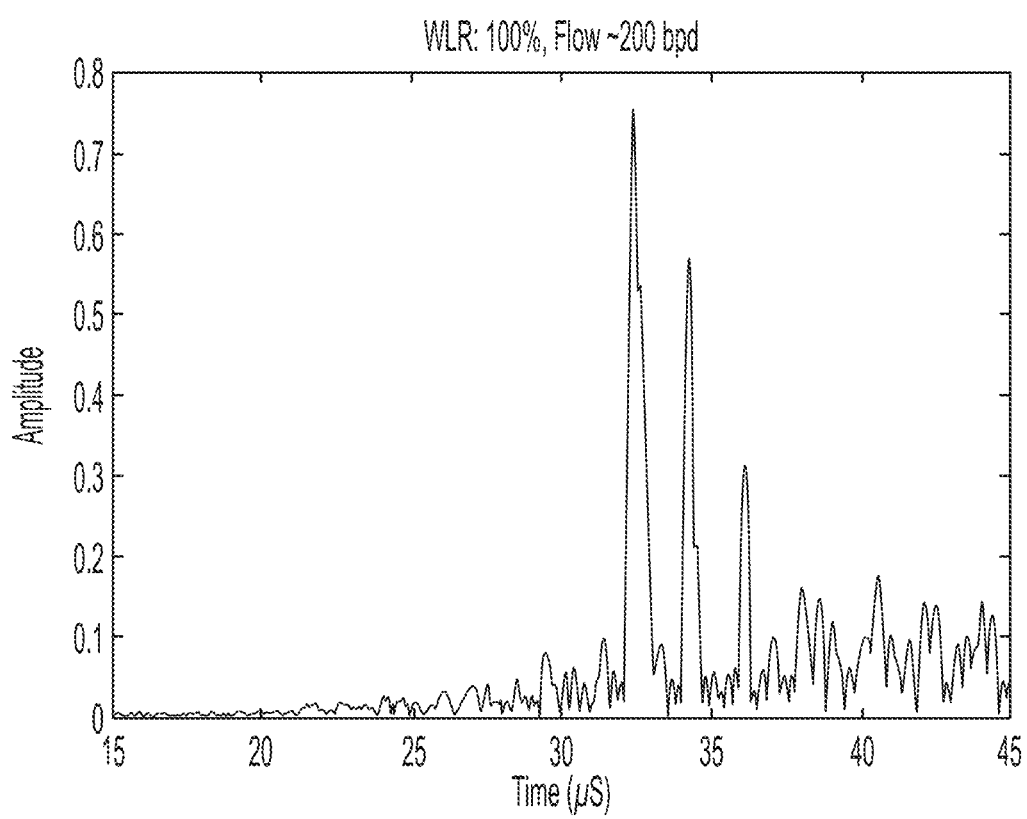

Referring now to FIGS. 10A-10C, received sound waves are graphically illustrated for a multiphase fluid comprising water and oil from various oil production well scenarios. As illustrated in FIG. 10A, for an approximately 10 bpd production well having a WLR of 100%, the time to first fluid interrogation peak is about 33 µs. As illustrated in FIG. 10B, for an approximately 100 bpd production well having a WLR of 100%, the time to first fluid interrogation peak is about 34 µs. As illustrated in FIG. 10C, for an approximately 200 bpd production well having a WLR of 100%, the time to first fluid interrogation peak is about 33 µs. FIGS. 10A-10C also indicate that production rate (flow through pipe) has minimal effect on sound speed.

Figure 11:
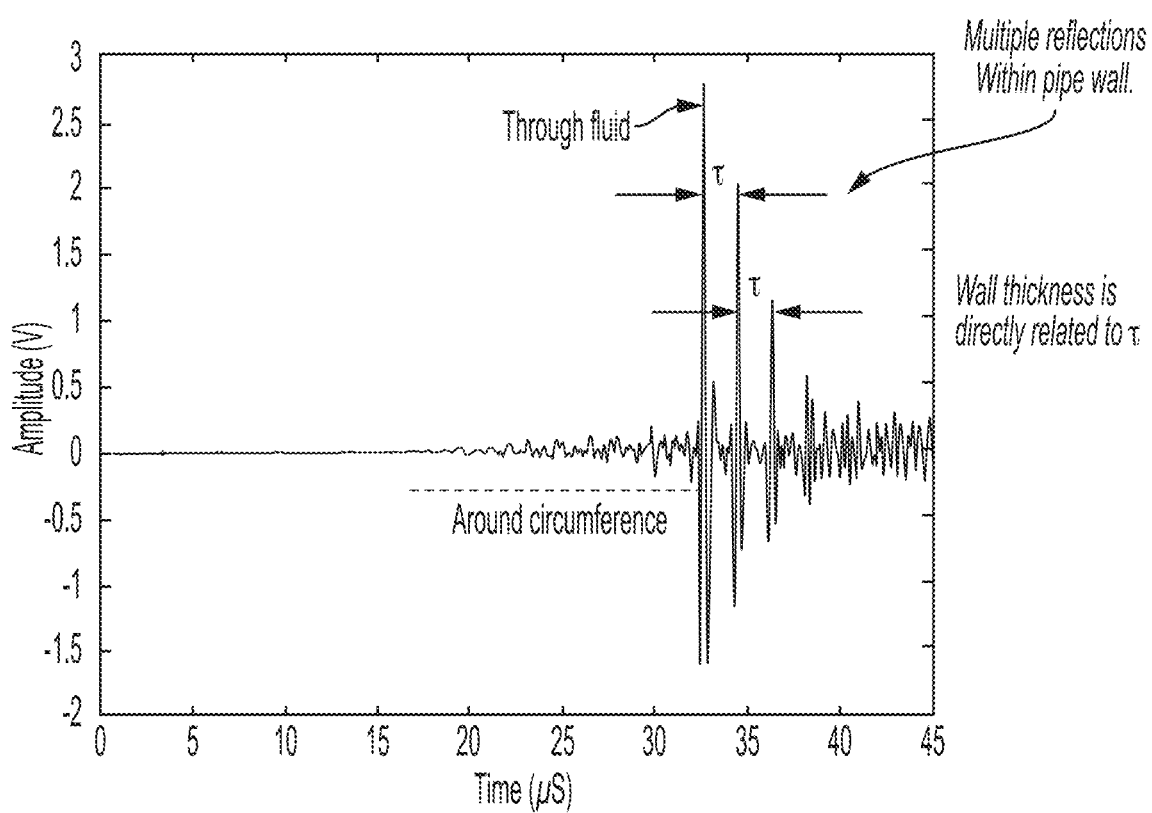
FIG. 11 is a graph of SWIFT measurements of a shaped waveform acoustic wave including circumferential modes and direct path acoustic signals, according to embodiments of the disclosure.

Referring now to FIG. 11, a left portion of the graph illustrates circumference sound waves arriving just prior to the first discernable amplitude peak associated with the primary sound waves traveling through the multiphase fluid and arriving at the receiver. The time between the first discernable amplitude peak and the subsequent (second) amplitude peak indicates reflections between walls of the pipe, which is related to pipe wall thickness, $\tau$. The graphical data illustrated in FIG. 11 is raw data from a cheap and fast A/D converter and illustrates the quality of measurement using, for example, the Gabor pulse. In some embodiments, the time of flight (TOF) of the sound waves illustrated by the first discernable amplitude peak is easily discernable from the circumferential signals. In some embodiments, a 100 MHz rate digitizer will easily provide 0.01-microsecond resolution. In some embodiments, a 500 $MHz^{-1}$ GHz digitizer can be used to measure TOF with sufficient accuracy. In some embodiments, the approach or method does not include a processing step, which may mean the measurement rates can be increased to about 1,000 measurements a second.

Figure 12:
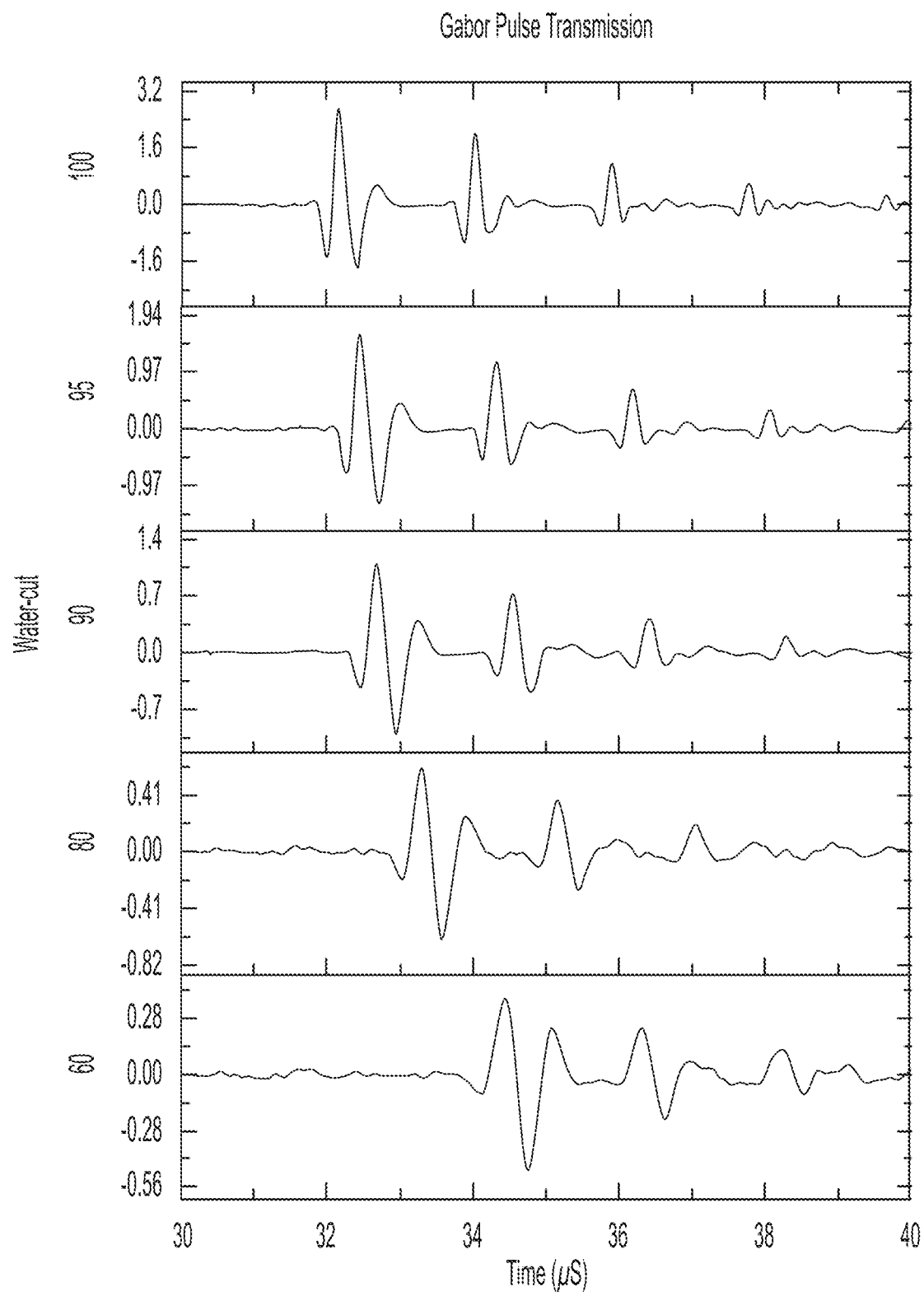
FIG. 12 is a graph of SWIFT measurements of a shaped waveform acoustic wave transmissions at various water-cut rates, according to embodiments of the disclosure.

Referring now to FIG. 12, received Gabor pulse transmissions for interrogating various crude oil/water mixtures is illustrated. As illustrated, the shape of the received Gabor pulse waveform becomes at least partly asymmetric due to attenuation, with decreased water-cut. As such, attenuation can be determined from asymmetry of the received pulse waveform. In addition, the sound speed can be determined from a shift to the right of the first discernable amplitude peak. For instance, between 100% water-cut and 60% water-cut, the time between transmission of the pulse, such as a Gabor pulse, and receiving the pulse traveling through the multiphase fluid results in a shift from about 32 µs to about 35 µs, indicating that increased crude oil in the multiphase fluid results in a reduced TOF of the pulse.

Figure 13:
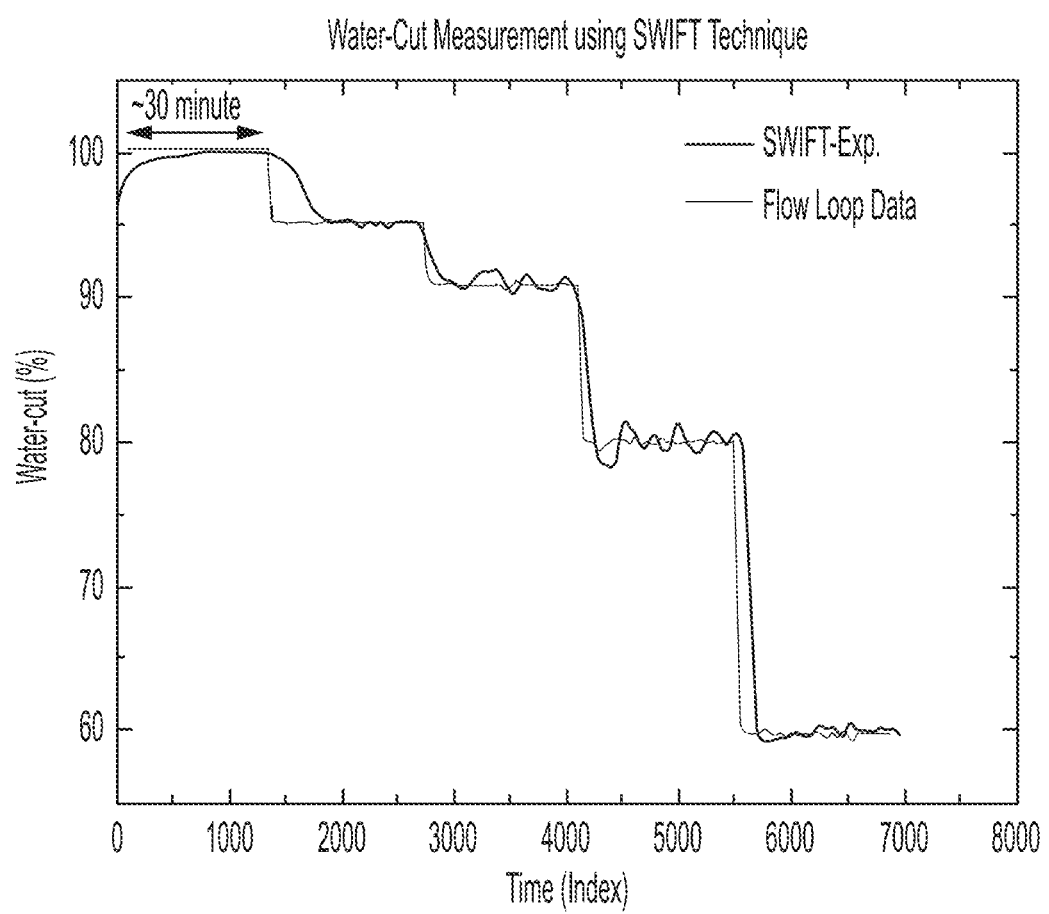
FIG. 13 is a graph of water-cut measurements using a SWIFT technique in which water-cut oscillations are due to temperature variations, according to an embodiment of the disclosure.

Referring now to FIG. 13, a graphical representation of measured water-cut using the SWIFT approach is presented in comparison to known and controlled water-cut data, i.e., flow loop data. For instance, the water-cut is maintained at 100% for about 30 minutes, and then stepped down at about 30-minute intervals to about 95% water-cut, about 90% water-cut, about 80% water-cut, and about 60% water-cut, respectively. It is evident from the degree to which the experimental data matches the flow loop data that the SWIFT approach is sufficiently accurate with respect to measuring water-cut percentage of the multiphase fluid. Without wishing to be bound by any particular theory, the oscillations in measured water-cut data may be due to temperature variations during the experimentation and are not corrected for in the raw data. The actual water-cut in the spool is set at about 100 feet away from the set point.

Figure 14:
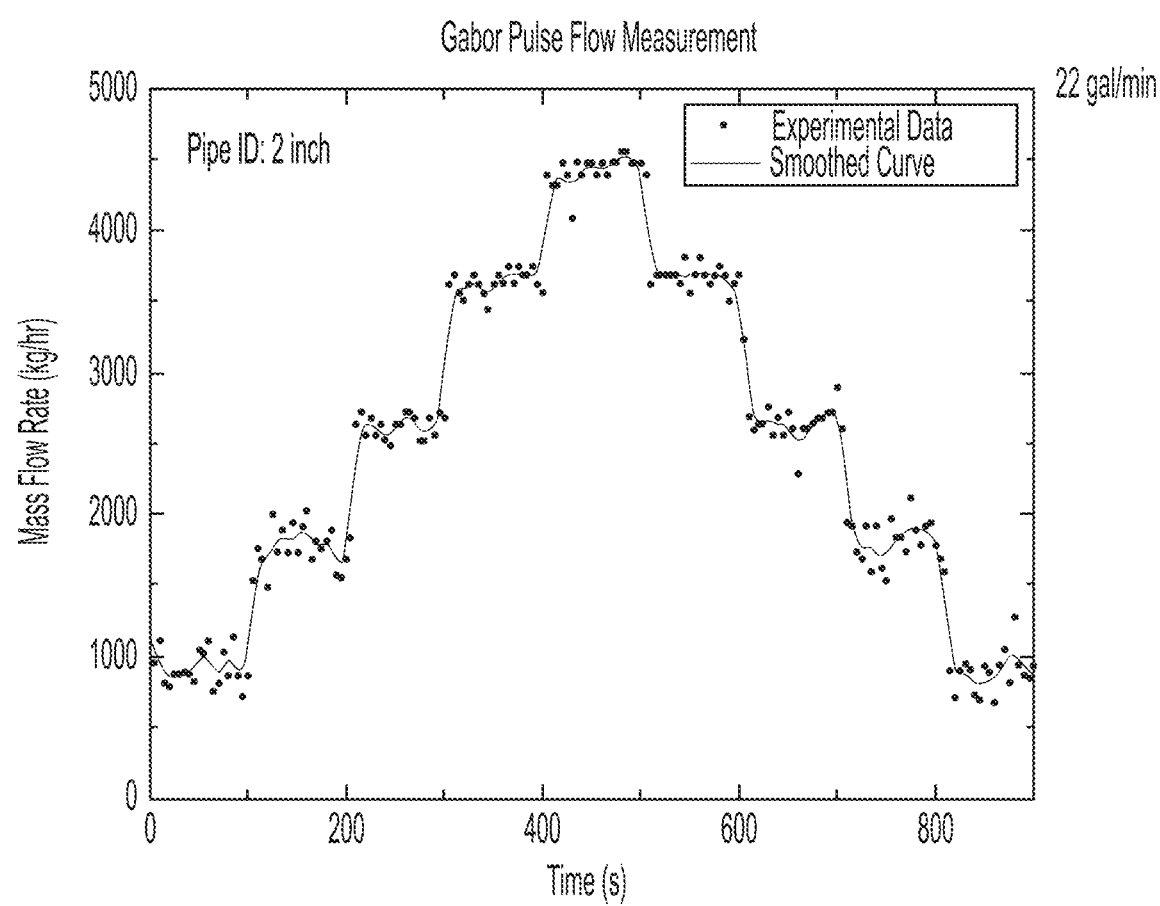
FIG. 14 is a graph of flow rate measurement data determined according to the SWIFT approach using a dual-channel transmission measurement, according to an embodiment of the disclosure.

Referring now to FIG. 14, a dual-channel transmission measurement was carried out and a mass flow rate measured according to the SWIFT approach for a 2-inch inner diameter pipe is presented graphically with a smoothed curve of the experimental data. During experimentation, the mass flow rate, in kg/hour, is increased in a stepwise fashion from about 1,000 kg/hour to about 2,500 kg/hour and then decreased in a stepwise fashion to about 1,000 kg/hour. As illustrated, the experimental measurement according to the SWIFT approach is sufficient to unambiguously determine the flow rate. Without wishing to be bound by any particular theory, the oscillations in measured flow rate data at each controlled flow rate may be due to temperature variations during the experimentation and are not corrected for in the raw data.

Referring now to FIGS. 14A-14D, example averaged signals associated with an acoustic wave transmitted through a multiphase fluid are illustrated. As shown, the time of flight (TOF) of the interrogation sound waves (e.g., shaped waveform acoustic wave) is easily discernable from the circumferential sound waves received just prior to the interrogation sound waves. Without wishing to be bound by any particular theory, amplitude decay may be associated with fluid density. In some embodiments, changes in the amplitude and frequency of the acoustic wave may be associated with changes in the flow rate, changes in a concentration of one or more components of the substance or material, the presence or absence of a particular component (such as a liquid, a solid, a gas, or the like), may be determined from the one or more characteristics of the acoustic wave or signal characteristics of the signal received at the computing device or the signal processor.

As illustrated in FIGS. 15A-15D, sound speed of an acoustic wave through multiphase fluids at increasing gas concentrations (i.e., GVF) is presented graphically for a water-based multiphase fluid flowing through an approximately 2-inch spool. As illustrated, in some embodiments, the sound speed is not affected by gas volume fraction, meaning that the pulse is able to travel through the multiphase fluid without experiencing interference from the gas bubbles in the multiphase fluid. As such, the time to initial discernable amplitude peak is about 31 µs, a TOF that does not significantly shift with increased gas bubble concentration (i.e., GVF). In particular, the maximum observed shift was an about 0.1% TOF increase. In some embodiments, therefore, the SWIFT approach may be carried out on multiphase fluid containing up to about 60 vol % gas bubbles without observing an appreciable increase in TOF. In some embodiments, this may mean that there is little or no effect on accuracy of density, flow rate, and/or GVF measurements due to such high percentages of gas bubbles in a multiphase fluid flowing through an interrogation zone of a pipe.

Referring now to FIG. 16, a graph of averaged received signal versus gas volume fraction (GVF) is illustrated for a single-channel noninvasive measurement according to the SWIFT approach. As illustrated, according to the SWIFT approach, the sound speed and GVF can be determined simultaneously from a single pulse signal interrogation of the multiphase fluid. As illustrated in FIG. 16, the averaged peak signal amplitude $V_{pp}$ in (mV) decreases from about 220 mV to about 25 mV as GVF increase from about 0% to about 57%. Without wishing to be bound by any particular theory, the sound speed of a pulse signal may be related to the time until averaged peak signal amplitude, whereas GVF may be related to amplitude fluctuation of the same received signal.

At least based upon the fact that the pulse signals described herein comprise a plurality of waveforms having a plurality of frequencies, the SWIFT approach may allow for simultaneous cross-correlation of multiple transmitters and receivers and TOF measurement.

Figure 17:
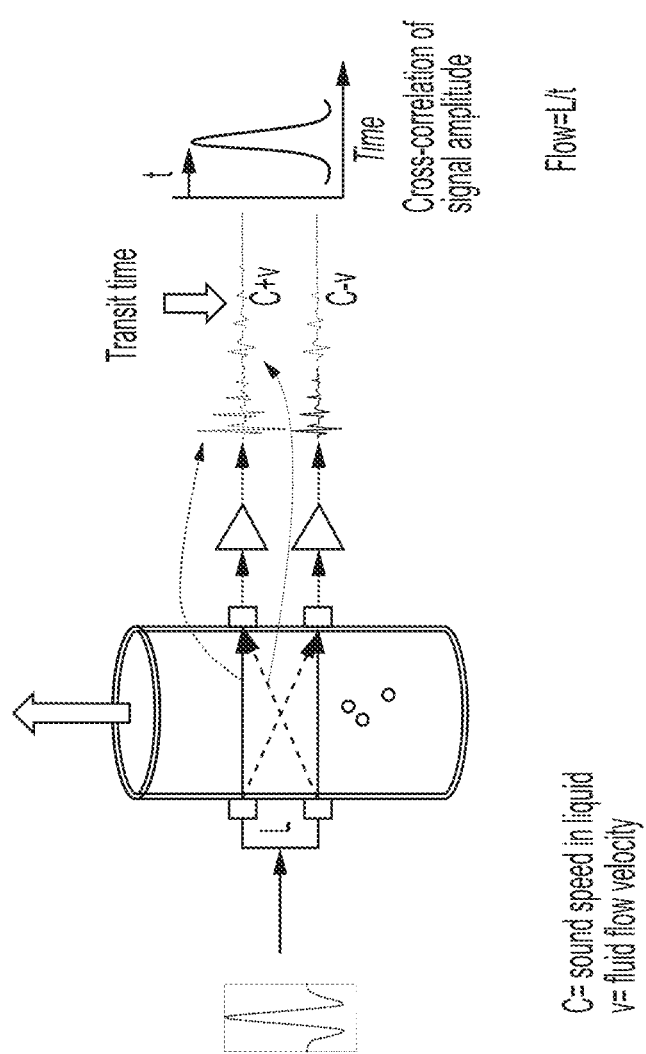
FIG. 17 illustrates a SWIFT flow measurement approach in which transit time of the acoustic signal is measured simultaneously with cross-correlation of signal amplitude, according to an embodiment of the disclosure.

For instance, as illustrated in FIG. 17, a system and device for SWIFT interrogation of a multiphase fluid flowing through a pipe is depicted. In some embodiments, the device can comprise a plurality of transmitters mounted on the pipe and a plurality of receivers mounted on the pipe opposite the plurality of transmitters. In some embodiments, the simultaneous transmission of an acoustic wave, by each of the plurality of transmitters can result in a primary interrogation signal from a respective transmitter to be transmitted along a primary interrogation signal path (illustrated as non-hashed arrows) through the interrogated fluid to the respective receiver, while at the same time a secondary interrogation signal is transmitted along a secondary interrogation signal path (illustrated as hashed arrows) from the respective transmitter is transmitted to a receiver adjacent to the respective receiver at an angle to the direction of the primary interrogation signal path. As such, the TOF of the primary interrogation signal between respective transmitters and receivers can be used to determine the sound speed of the signal in the multiphase fluid and to determine various measurements and characteristics of the multiphase fluid. In addition, according to some embodiments, the TOF of the primary interrogation signal can be compared to the TOF of the secondary interrogation signal, by summing TOF and fluid flow velocity and then independently subtracting fluid flow velocity from TOF. In such a way, the SWIFT approach enables a cross-correlation of signal amplitude. This is enabled only by the SWIFT approach, and not by conventional approaches at least because, in some embodiments, the SWIFT approach utilizes short period sound waves, short duration sound pulses, or the like, which means that the secondary interrogation signal is not convoluted with the primary interrogation signal or with subsequent primary interrogation signals.

According to some embodiments, a system or device can be provided that includes one or more transmitting transducers, one or more receiving transducers, a waveform generator, and a computing device. In some embodiments, the system or device can be configured to transmit a sound wave from the one or more transmitting transducers to the one or more receiving transducers. In some embodiments, the system or device can be disposed within a factory, manufacturing facility, processing plant, fulfillment center, warehouse, cold storage building, telecommunications building, power generation facility, water treatment plant, wastewater treatment plant, refinery, biochemical plant, mills, textile mills, automotive manufacturing, smelting plant, recycling facility, sortation facility, fabrication facilities, biomanufacturing plants, bioprocessing facilities, variations thereof, combinations thereof, or the like. In some embodiments, an apparatus can be provided as a kit that can be disposed to a particular location within a facility, factory, plant, mill, or the like on an as-needed basis. In other embodiments, an apparatus can be installed in a particular location within a facility, factory, plant, mill, or the like permanently or for the life of the particular facility configuration or operation. In some embodiments, the apparatus can be disposed adjacent or about a pipe or a section of pipe in a similar manner to that of a strap-on magnetic flow meter or the like. Said otherwise, an apparatus can comprise a single collar that is disposed about the pipeline and comprises the one or more transmitting transducers and one or more receiving transducers, waveform generator, and computing device. In some embodiments, at least one of the transmitting transducers and at least one of the receiving transducers can be disposed to an outer wall of the pipe or section of pipe while other components or elements of the apparatus can be remotely located or located adjacent to the pipe or section of pipe.

By way of example only, an apparatus can be provided that comprises one transmitting transducer, one receiving transducer, one signal generator, and a computing device. The apparatus can be configured for real-time or substantially real-time monitoring of composition change for a multiphase fluid comprising water, a growth formula, and a cell culture as the multiphase fluid is transported through a conduit between an initial seeding and mixing chamber and a wave bioreactor, single-use bioreactor, or mixed stainless bioreactor for stable monoclonal antibody (mAB) bioproduction. Such a biomanufacturing process may require the multiphase fluid to have a precise composition during all parts of a bioprocessing batch or continuous bioprocessing run. Since such a biomanufacturing process must typically be highly repeatable and often must be carried out in a 'clean room' or sterile manufacturing environment, direct analysis of aliquots of the multiphase fluid is typically not possible. As such, a real-time or substantially real-time analysis and monitoring approach, such as the SWIFT approach described herein, can be advantageous. As such, an apparatus as described herein can be disposed to the conduit to carry out such real-time analysis and monitoring in the clean room manufacturing environment. The transmitting transducer can be disposed on a first side of the conduit and the receiving transducer can be disposed on a second side of the conduit opposite the first side. The computing device can be configured to cause the signal generator to generate a signal that causes the transmitting transducer to transmit an acoustic wave through the conduit, through the multiphase fluid being transported therethrough, and to the receiving transducer. Then, an initial experimental analysis of the multiphase fluid being transported between the seeding and mixing chamber to the bioreactor is carried out by taking an aliquot for conventional compositional analysis at the same time that the apparatus is used to transmit a sound wave having a shaped waveform through the conduit transporting the multiphase fluid between the seeding and mixing chamber and the bioreactor. The composition of the multiphase fluid or one or more components thereof can then be varied in a controlled manner while continuing to take aliquots of the multiphase fluid and transmitting further sound waves through the conduit and the multiphase fluid therein. From this initial analysis, a calibration curve of composition changes to changes in one or more characteristics of the sound wave received at the receiving transducer can be generated. The clean room manufacturing facility can then be re-sterilized and ongoing analysis (e.g., real-time analysis) using the apparatus can be carried out during batch or continuous bioprocessing runs. In some embodiments, the real-time analysis may be used to calibrate the input of raw materials to upstream processes such as the seeding and mixing chamber or other such process steps, for documentation purposes, for compliance with one or more local, federal, international, or customer-based processing requirements or standards, to trigger shut down of manufacturing if the composition of the multiphase fluid becomes 'out of specification', and/or the like. In some embodiments, the time of flight of the acoustic wave may be longer for the growth medium than for the water and the time of flight of the acoustic wave may not be affected by the only slight variations in cell culture concentration within the multiphase fluid, e.g., due to viscosity and molecular differences between water and the growth medium and because the cell culture represents such a small percent by weight or volume of the multiphase fluid, that the compositional analysis using the apparatus can be simplified to monitoring the change over time of the relative concentration of growth medium to water. In some embodiments, as the time of flight increases, a known and predictable change in the relative concentration of growth medium to water can be calculated, measured, determined, estimated, or predicted using the calibration curve discussed above. As such, during manufacturing, one or more thresholds may be set for relative concentration of the growth medium to water. For instance, a lower threshold of growth medium concentration to water may be set, below which the cell culture will not have access to sufficient growth medium during the bioreaction stage. Additionally or alternatively, an upper threshold of growth medium concentration to water may be set, above which the viscosity of the multiphase fluid is too high for effective bioreaction during the bioreactor stage. Other reasons, conditions, indicators, or thresholds may be established based upon the determined relationship between changes in the multiphase fluid and changes in characteristics of the acoustic wave received at the receiving transducer.

As another example, an apparatus can be provided that comprises a transmitting transducer, a receiving transducer, a waveform generator, and a computing device. The apparatus can be provided for medical applications in which a biological vessel, artery, lumen, chamber, canal, arteriole, capillary, venule, vein, or the like is the conduit or section of conduit being analyzed using the SWIFT approach described herein. In some embodiments, ongoing analysis of a flow rate of the blood through the biological conduit can be carried out by placing a transmitting transducer on one side of the biological conduit, placing a receiving transducer on the opposite side of the biological conduit, and transmitting a short duration acoustic wave, such as a shaped waveform comprising a Gabor pulse or the like, through the biological conduit iteratively. In some embodiments, the time of flight of the short duration acoustic wave may be reduced by attrition as the flow rate increases, which means that a calibration curve can be generated by operating the apparatus as the patient is caused to increase or decrease their heart rate (e.g., by starting at rest, then walking on a treadmill, then running on the treadmill) and measuring the time of flight of short duration acoustic waves through the biological conduit as a function of flow rate of the blood through the biological conduit as the patient's heart rate increases, thereby creating a calibration curve for the SWIFT analysis. Then, the flow rate of the blood through the biological conduit can be monitored using the SWIFT approach in an ongoing basis or iteratively thereafter and calculated, determined, measured, estimated, or predicted based upon at least the calibration curve that is generated.

As yet another example, an apparatus can be provided, such as described herein, for carrying out the SWIFT analysis in a water treatment plant. For instance, during water treatment, after screening of intake water and prior to sand filtration, an upflow clarifier or the like is often used to remove particulates and biological material, to reduce the turbidity of the water, and to reduce strain on the sand filters downstream. In such a process, it may oftentimes be important to understand the solids loading rate of water that is coming off the outflow weir of the upflow clarifier and going through a pipe to the sand filter(s). By disposing an apparatus such as described herein to the pipe between the upflow clarifier and the sand filter(s) that carries the water therebetween for further filtration at the sand filters, the solids loading rate can be determined or monitored without having to remove samples or run continuous sampling line from that pipe to a systems control office or lab. Initial analysis can determine that the amplitude, time of flight, waveform shape, and/or frequency of the sound wave can be changed in a predictable manner as a function of changes in solids loading in the fluid within the pipe, and a calibration curve can be created for this relationship. Then, the apparatus can be used to provide ongoing analysis or monitoring of solids loading rate in the water going to the sand filters and can be used to trigger chemical addition to the water prior to the upflow clarifier and/or prior to the sand filter(s), can be used to trigger a backwash or flush of the upflow clarifier, can be used to trigger a bypass valve to recycle or revert water back to the reservoir or upflow clarifier intake chamber in an instance in which the solids loading rate is high enough so as to present a risk to the operation or structural integrity of the sand filter(s), and/or the like.

By way of example, other applications for the SWIFT approach and apparatus/system described herein can include applications in harsh environments or environments that are inhospitable to humans. For instance, harsh environments can include environments like the ones typically found in geothermal applications, oil & gas applications, nuclear material repositories, brownfield cleanup sites, $CO_2$ sequestration facilities, pump & treat groundwater remediation sites, and the like. In some embodiments, the SWIFT approach can be especially helpful for applications in which it can be dangerous, expensive, inefficient, or otherwise detrimental to conduct conventional analysis by sampling a fluid flow and conducting iterative or real-time analysis with the fluid samples. Other applications for which this approach is known to be suitable and provide various benefits include but are not limited to: petroleum oil refineries, atmospheric distillation subprocesses, fluid catalytic crackers, vacuum distillation units, reformers, hydrotreaters, gas processing facilities, gas compressor stations, distillation systems, crystallization systems, fractionation trains, NG sweetening units, dehydration units, biofuel and bioenergy refineries, hydraulic fracturing (fracking) facilities, crude extraction wells, edible oil refineries, natural gas processing plants, sugar refineries, salt refineries, food processing plants, nuclear power generation facilities, combined cycle natural gas power generation facilities, coal power generation facilities, hydroelectric power generation facilities, mining operations, metal refineries, smelting operations, manufacturing facilities, and/or the like.

In some embodiments, an apparatus can be provided that includes one or more transmitter transducers and one or more receiver transducers with a substance or material positioned therebetween. In some embodiments, the substance or material may be liquid-based, gas-based, solid-based, or the like, and may include one or more other material phases. In some embodiments, the substance or material being interrogated may be disposed within an enclosure or container during SWIFT interrogation, but in other embodiments it may be disposed between the transducers without any pipe, container, enclosure, or the like. In some embodiments, the transducers may be mounted directly on to the substance or material or otherwise supported on or disposed on the substance or material during SWIFT interrogation of the substance or material. In some embodiments, the substance or material may be in motion during SWIFT interrogation while in other embodiments the substance or material may be at rest during SWIFT interrogation. In some embodiments, the shaped waveform of the acoustic wave may be chosen or generated based at least upon a desired one or more characteristics of the substance or material that are desired to be known. In some embodiments, the shaped waveform of the acoustic wave may be chosen or generated based at least upon a known or suspected property of the substance or material that is associated with or changes as a function of one or more changes of at least one of the one or more characteristics of the substance or material.

Additionally, in many high-pressure or high-temperature processes or systems, it may be disadvantageous to directly sample a highly pressurized or high temperature fluid to determine iterative or real-time characteristics like flow rate, composition changes, solid loading rate, gas volume fraction, or the like. For instance, other suitable applications are contemplated, without limitation, as applications requiring an apparatus for measuring sound speeds of liquids that is capable of performing high precision measurements, portable between test environments, mechanically rugged, and able to withstand high temperatures; e.g., including for the characterization of Enhanced Geothermal Systems (EGS) or Hot Dry Rock (HDR) working fluids, as well as those in the oil industry. In some embodiments, sound speed varies with many physical parameters of a liquid such as temperature, pressure, and dissolved solid or gas content. Thus, when used with complimentary characterization tools, sound speed provides valuable information regarding the dynamics of a fluid system.

The vast majority of land area in the United States has temperatures of less than 250° C. at depths up to 10 km there beneath, making the SWIFT approach a good approach for use as a down hole characterization instrument, and various high temperature and high pressure modifications can be made to the described device to improve its usability in such harsh or remote environments. As such, in some embodiments, the high pressures of such environments can be accommodated by incorporating appropriately thick walls in the device packaging, and other modifications may be made so the apparatus or system can withstand the temperatures characteristic of down hole applications. Likewise, fluids in geothermal systems are chemically harsh brines which are corrosive, which may mean that particular materials can be selected for housing materials, sealing materials, internal components, or the like to improve the durability of the apparatus in such environments.

In some embodiments, an apparatus can thus be provided that is specifically configured to achieve the foregoing and other objects, and in accordance with the purposes of one or more described embodiments, for harsh environment applications. For instance, an apparatus can be configured to be able to withstand high temperatures and/or high pressures, and can be classified as a high-temperature, high-pressure acoustic interferometry device. In some embodiments, an apparatus can be provided that comprises: a first piezoelectric transducer; a first enclosure effective for protecting the first transducer from mechanically and chemically harsh environments. In some embodiments, the first enclosure can have a first side with a flat exterior surface and a flat interior surface parallel thereto. In some embodiments, the first transducer can be acoustically coupled to the interior surface of the first side. In some embodiments, the apparatus can further comprise: a second piezoelectric transducer and a second enclosure effective for protecting the second transducer from mechanically and chemically harsh environments. In some embodiments, the second enclosure can comprise a second side with a flat exterior surface and a flat interior surface parallel thereto. In some embodiments, the second transducer can be acoustically coupled to the interior surface of the second side. In some embodiments, the exterior surface of the first side of said first enclosure and the exterior surface of the second side of the second enclosure can be positioned parallel and spaced apart a selected distance, forming thereby a volume. In some embodiments, the apparatus can further comprise: a spacer member configured for establishing and maintaining the selected distance and parallel disposition of the first side and the second side. In some embodiments, the apparatus can further comprise: a signal generator for supplying one or more chosen electrical signals to the first piezoelectric transducer in order to cause the first piezoelectric transducer to generate an acoustic wave having a particular shaped waveform, such as one of those described herein. In some embodiments, the apparatus can further comprise: a signal gain and phase analyzer for receiving electrical signals from the second transducer. In some embodiments, the apparatus can further comprise: a processor for processing the received electrical signals from the signal gain and phase analyzer or for analyzing the raw signal provided directly from the second transducer. In some embodiments, the processor can be configured for controlling the signal generator. Other suitable apparatuses are described in more detail in U.S. Pat. No. 10,352,907, the entire disclosures of which are hereby incorporated herein by reference in their entireties for all purposes.

Some embodiments provide an apparatus for measuring one or more properties of a multiphase material. The apparatus may include one or more transmitting transducers configured to transmit, through the multiphase material, an acoustic wave having a shaped waveform and comprising predetermined frequency content, a duration of the acoustic wave being less than a threshold duration. The one or more receiving transducers may be configured to receive the acoustic wave transmitted through the multiphase material by the one or more transmitting transducers. The apparatus may also include a computing device configured to measure one or more characteristics of the acoustic wave received by the one or more receiving transducers. The computing device being further configured to determine, based at least upon the one or more characteristics of the acoustic wave received by the one or more receiving transducers, the one or more properties of the multiphase material. In some embodiments, the transmitting transducers may include piezoelectric transducers. The transducers may be contact transducers, non-contact transducers, electromagnetic acoustic transducers, or laser vibrometers. The computing device may be further configured to cause a waveform generator to generate the acoustic wave having the shaped waveform and including the predetermined frequency content by summing two or more different waveforms. The two or more different waveforms may include at least one frequency at which an amplitude of the two or more different waveforms are different. In embodiments, the duration may be between about 0.1 µs and about 20 µs. In embodiments, the predetermined frequency content may include one or more frequencies between about 10 kHz and about 50 MHz.

Other embodiments may provide a computer program product for measuring one or more properties of a multiphase material. The computer program product may include at least one non-transitory computer-readable storage medium having computer executable program code instructions stored therein. The computer executable program code instructions may include program code instructions configured, upon execution, to: transmit, from one or more transmitting transducers through a multiphase material, to one or more receiving transducers, an acoustic wave having a shaped waveform and including predetermined frequency content, a duration of the acoustic wave being less than a threshold duration; measure one or more characteristics of the acoustic wave, once received by the one or more receiving transducers; and determine, based at least upon the one or more characteristics of the acoustic wave, the one or more properties of the multiphase material.

Other embodiments provide methods of measuring one or more properties of a multiphase fluid, the methods may include: transmitting, from one or more transmitting transducers disposed at a first one or more positions on a section of pipe containing the multiphase fluid, to one or more receiving transducers disposed at a second one or more positions on the section of pipe, an acoustic wave having a shaped waveform and comprising a duration of the acoustic wave being less than a threshold duration. The first portion of the acoustic wave may travel circumferentially about the section of pipe between the one or more transmitting transducers and the one or more receiving transducers. A second portion of the acoustic wave may travel from the one or more transmitting transducers, through a first wall of the section of pipe, through the multiphase fluid, through a second wall of the section of pipe, and to the one or more receiving transducers. The methods may further comprise measuring one or more characteristics of the acoustic wave, once received by the one or more receiving transducers; and determining, based at least upon said one or more characteristics of the acoustic wave, the one or more properties of the multiphase fluid. Embodiments may further provide for the acoustic wave to be a first acoustic wave transmitted during a first time. The methods may further include transmitting, during a second time, from said one or more transmitting transducers, through the section of pipe containing the multiphase fluid, to the one or more receiving transducers, a second acoustic wave having a second shaped waveform. The methods may further include comparing the one or more characteristics of the acoustic wave once received by the one or more receiving transducers to calibration values associated with the section of pipe and/or the multiphase fluid, the calibration values being associated with said one or more properties of the multiphase fluid as a function of the one or more characteristics of the acoustic wave; and determining the one or more properties of the multiphase fluid therefrom. In embodiments, the acoustic wave may include two or more acoustic waves having two or more different waveforms. The two or more different waveforms may be overlapping or summed to form the shaped waveform. The acoustic wave may include a frequency between about 10 kHz and about 50 MHz. The duration of the acoustic wave may be between about 0.1 µs and about 20 µs. The one or more transmitting transducers may be piezoelectric transducers. The transducers may in embodiments include one or more from among: contact transducers, non-contact transducers, electromagnetic acoustic transducers, and laser vibrometers. Some methods may include receiving an electrical signal, at one or more computing devices, from the one or more receiving transducers, an electrical signal indicative of said acoustic wave as received by the one or more receiving transducers; and filtering the electrical signal to remove vibrational frequencies outside of a range of frequencies of the shaped waveform of the acoustic wave. In other embodiments, the two or more different waveforms may include one or more from among: a Gaussian waveform, a sinusoidal modulated Gaussian waveform, and a Gabor waveform. The acoustic wave may be in embodiments, a second acoustic wave transmitted between the one or more transmitting transducers and the one or more receiving transducers during a second time and the measuring may be measuring during the second time. The methods may further include determining, during a first time prior to the second time, the one or more properties of an aliquot of said multiphase fluid; transmitting, during the first time, from the one or more transmitting transducers to the one or more receiving transducers, a first acoustic wave having the shaped waveform comprising the two or more overlapping waveforms, the duration of the first acoustic wave being less than the threshold duration; measuring the one or more characteristics of the first acoustic wave; and generating a calibration curve based upon at least a comparison of the one or more properties of the aliquot of the multiphase fluid and the one or more characteristics of the first acoustic wave, wherein the determining is based at least upon the one or more characteristics of the second acoustic wave and the calibration curve.

Other embodiments may include an apparatus for measuring one or more properties of a multiphase fluid, the apparatus may include a section of pipe having an inner volume configured to contain or convey the multiphase fluid; one or more transmitting transducers configured to generate an acoustic wave having a shaped waveform, and transmit the acoustic wave through the section of pipe and the multiphase fluid a duration of the acoustic wave being less than a threshold duration. The apparatus may further include one or more receiving transducers configured to receive the acoustic wave transmitted through said section of pipe by said one or more transmitting transducers; and a computing device configured to: determine, based upon one or more characteristics of the acoustic wave received by the one or more receiving transducers, the one or more properties of the multiphase fluid, wherein a first portion of the acoustic wave travels circumferentially about the section of pipe between the one or more transmitting transducers and the one or more receiving transducers, and wherein a second portion of the acoustic wave travels from the one or more transmitting transducers, through a first wall of the section of pipe, through the multiphase fluid, through a second wall of the section of pipe, and to the one or more receiving transducers. In embodiments, the computing device may be further configured to compare the one or more characteristics of the acoustic wave, once received by the one or more receiving transducers, to calibration values associated with the section of pipe and/or the multiphase fluid, said calibration values being associated with the one or more properties of the multiphase fluid as a function of the one or more characteristics of the acoustic wave, and determine the one or more properties of the multiphase fluid therefrom. In some embodiments, the acoustic wave may include two or more acoustic waves having two or more different waveforms, the two or more different waveforms being overlapping or summed to form the shaped waveform. In embodiments, the frequency of the acoustic wave may be between about 10 kHz and about 50 MHz. The duration of the acoustic wave may be between about 0.1 µs and about 20 µs. The one or more transmitting transducers may include piezoelectric transducers and the one or more receiving transducers may include one or more from among: contact transducers, non-contact transducers, electromagnetic acoustic transducers, and laser vibrometers. In embodiment, the computing device may be further configured to receive, from the one or more receiving transducers, an electrical signal indicative of the acoustic wave as received by the one or more receiving transducers; and cause filtering of the electrical signal to remove vibrational frequencies outside of a range of frequencies of the acoustic wave. In some embodiments, the acoustic wave may be a second acoustic wave transmitted during a second time and the computing device may be configured to: determine the one or more properties of the second acoustic wave during the second time; determine, during a first time prior to said second time, one or more properties of an aliquot of said multiphase fluid; cause, during said first time, said one or more transmitting transducers to transmit a first acoustic wave having the shaped waveform and including the two or more overlapping waveforms towards the one or more receiving transducers, the duration of the first acoustic wave being less than said threshold duration; measure the one or more characteristics of the first acoustic wave, generate a calibration curve based upon at least a comparison of the one or more properties of the aliquot of the multiphase fluid and the one or more characteristics of said first acoustic wave, and determine the one or more properties of the multiphase fluid based at least upon said one or more characteristics of said second acoustic wave and said calibration curve. The two or more waveforms may include one or more from among: a Gaussian waveform, a sinusoidal modulated Gaussian waveform, and a Gabor waveform.

Yet other embodiments may provide for a computer program product for measuring one or more properties of a multiphase fluid, the computer program product may include at least one non-transitory computer-readable storage medium having computer executable program code instructions stored therein, the computer executable program code instructions comprising program code instructions configured, upon execution, to: cause one or more transmitting transducers to transmit, towards one or more receiving transducers, an acoustic wave having a shaped waveform, a duration of the acoustic wave may be less than a threshold duration, the multiphase fluid being disposed within a section of pipe and substantially between the one or more transmitting transducers and the one or more receiving transducers, wherein a first portion of the acoustic wave may travel circumferentially about the section of pipe between the one or more transmitting transducers and the one or more receiving transducers, and wherein a second portion of the acoustic wave may travel from the one or more transmitting transducers, through a first wall of the section of pipe, through the multiphase fluid, through a second wall of the section of pipe, and to the one or more receiving transducers; the computer executable program code instructions may further include program code instructions configured, upon execution, to: cause measurement of one or more characteristics of the acoustic wave once received by the one or more receiving transducers; and determine, based at least upon the one or more characteristics of the acoustic wave, the one or more properties of the multiphase fluid.

To provide an overall understanding, certain illustrative embodiments have been described; however, it will be understood by one of ordinary skill in the art that the systems, apparatuses, and methods described herein can be adapted and modified to provide systems, apparatuses, and methods for other suitable applications and that other additions and modifications can be made without departing from the scope of the systems, apparatuses, and methods described herein.

The embodiments described herein have been particularly shown and described, but it will be understood that various changes in form and details may be made. Unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems or methods. Additionally, the shapes and sizes of components are also exemplary and unless otherwise specified, can be altered without affecting the scope of the disclosed and exemplary systems, apparatuses, or methods of the present disclosure.

As used herein, the terms "about," "substantially," and "approximately" generally mean plus or minus 10% of the value stated, for example about 5 µs would include 4.5 µs to 5.5 µs, approximately 10 µs would include 9 µs to 11 µs, etc. Likewise, the symbol "~" as used herein means "about," as defined above. For instance, ~60% would include 54%-66%.

Conventional terms in the fields of at least materials science, chemical engineering, and acoustic interferometry have been used herein. The terms are known in the art and are provided only as a non-limiting example for convenience purposes. Accordingly, the interpretation of the corresponding terms in the claims, unless stated otherwise, is not limited to any particular definition. Thus, the terms used in the claims should be given their broadest reasonable interpretation.

Although specific embodiments have been illustrated and described herein, it will be appreciated by those of ordinary skill in the art that any arrangement that is adapted to achieve the same purpose may be substituted for the specific embodiments shown. Many adaptations will be apparent to those of ordinary skill in the art. Accordingly, this application is intended to cover any adaptations or variations.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure and is submitted with the understanding that it will not be used to interpret or limit the scope or meaning of the claims. In this Detailed Description, various features may have been grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments may be combined with each other in various combinations or permutations. The scope of the embodiments should be determined with reference to the appended claims, along with the full scope of equivalents to which such claims are entitled.

What is claimed is:

1. A method for measuring one or more properties of a multiphase material, the method comprising:
   transmitting, from one or more transmitting transducers through a multiphase material, to one or more receiving transducers, an acoustic wave having a shaped waveform and comprising predetermined frequency content, a duration of the acoustic wave being less than a threshold duration;
   measuring one or more characteristics of the acoustic wave, once received by the one or more receiving transducers;
   determining, based at least upon the one or more characteristics of the acoustic wave, the one or more properties of the multiphase material; and
   generating the shaped waveform from a plurality of waveforms,
   wherein the plurality of waveforms comprises at least one frequency at which an amplitude of the plurality of waveforms are different.

2. The method of claim 1, wherein the threshold duration is between about 0.1 µs and about 20 µs.

3. The method of claim 1, wherein the predetermined frequency content comprises a predetermined bandwidth.

4. The method of claim 3, wherein the predetermined frequency content comprises one or more frequencies between about 10 kHz and about 50 MHz.

5. The method of claim 1, further comprising:
   comparing the one or more characteristics of the acoustic wave, once received by the one or more receiving transducers, to calibration values associated with one or more properties of the multiphase material as a function of the one or more characteristics of the acoustic wave; and
   determining the one or more properties of the multiphase material therefrom.

6. The method of claim 1, further comprising:
   receiving, at one or more computing devices, from the one or more receiving transducers, an electrical signal indicative of the acoustic wave as received by the one or more receiving transducers; and filtering the electrical signal to remove frequencies outside of a range of frequencies of the shaped waveform of the acoustic wave.

7. The method of claim 1, wherein the plurality of waveforms comprises one or more from among: a Gaussian waveform, a sinusoidal modulated Gaussian waveform, and a Gabor waveform.

8. The method of claim 1, further comprising:
sampling the multiphase material;
determining the one or more properties of the sample of the multiphase material;
transmitting, from the one or more transmitting transducers to the one or more receiving transducers, the acoustic wave having the shaped waveform, wherein the duration of the acoustic wave is less than the threshold duration;
measuring the one or more characteristics of the acoustic wave; and
generating calibration values based upon at least a comparison of the one or more properties of the sample of the multiphase material and the one or more characteristics of the acoustic wave.

9. The method of claim 1, wherein the one or more characteristics of the acoustic wave comprise at least one from among: sound speed, time of flight, amplitude, amplitude decay, period, frequency, duration, attenuation, modulation, acoustic impedance, acoustic contrast factor, direction of vibration, wavelength, acoustic pressure field, waveform shape, acoustic pressure, acoustic wave velocity, acoustic intensity, sound pressure, angular frequency, wave number, phase angle, propagation speed, absorption coefficient, degree of diffraction, transmission rate, elastic moduli, and third order elastic moduli.

10. The method of claim 1, wherein the one or more properties of the multiphase material comprise at least one from among: chemical composition, mass, density, volume, flow rate, viscosity, dimensions, thickness, fluid pressure, degree of homogeneity, rheology, gas volume fraction, solids loading rate, turbulence, hydrodynamic shearing effects, number and type of components, impurities rate, elasticity, plasticity, specific weight, and adiabatic compressibility.

11. A method for determining composition information of a multiphase material, the method comprising:
transmitting, from one or more transmitting transducers through a multiphase material, to one or more receiving transducers, an acoustic wave having a shaped waveform and comprising predetermined frequency content, a duration of the acoustic wave being less than a threshold duration;
measuring one or more characteristics of the acoustic wave, once received by the one or more receiving transducers, wherein the one or more characteristics comprise at least a time of flight of the acoustic wave;
determining, based at least upon the time of flight of the acoustic wave, the composition information; and
generating the shaped waveform from a plurality of waveforms,
wherein the plurality of waveforms comprises at least one frequency at which an amplitude of the plurality of waveforms are different.

12. The method of claim 11, wherein the threshold duration is between about 0.1 µs and about 20 µs.

13. The method of claim 12, wherein the predetermined frequency content comprises one or more frequencies between about 10 kHz and about 50 MHz.

14. The method of claim 13, wherein the multiphase material comprises at least a first fluid and a second fluid.

15. The method of claim 11, wherein the determining the composition information comprises:
comparing the one or more characteristics of the acoustic wave, once received by the one or more receiving transducers, to calibration values associated with one or more properties of the multiphase material as a function of the time of flight.

16. A method for determining flow rate of a multiphase material, the method comprising:
transmitting, from a first transmitting transducer through a multiphase material, a first acoustic wave having a shaped waveform and comprising predetermined frequency content, a duration of the acoustic wave being less than a threshold duration;
transmitting, from a second transmitting transducer located a predetermined distance from the first transmitting transducer, through the multiphase material, a second acoustic wave having the shaped waveform and comprising the predetermined frequency content, the duration of the second acoustic wave being less than the threshold duration;
receiving by a first receiving transducer a first portion of the first acoustic wave having the shaped waveform, the first portion of the first acoustic wave having travelled a first path;
receiving by the first receiving transducer a first portion of the second acoustic wave having the shaped waveform, the first portion of the second acoustic wave having travelled a second path;
receiving by a second receiving transducer a second portion of the first acoustic wave having the shaped waveform, the second portion of the first acoustic wave having travelled a third path, the third path intersecting the second path;
receiving by the second receiving transducer a second portion of the second acoustic wave having the shaped waveform, the second portion of the second acoustic wave having travelled a fourth path that is parallel with the first path;
measuring one or more characteristics of the first acoustic wave, wherein the one or more characteristics comprise at least a time of flight of the first acoustic wave;
measuring one or more characteristics of the second acoustic wave, wherein the one or more characteristics comprise at least a time of flight of the second acoustic wave; and
determining, based at least upon the time of flight of the first acoustic wave and the time of flight of the second acoustic wave, the flow rate of the multiphase material.

17. The method of claim 16, wherein the threshold duration is between about 0.1 µs and about 20 µs.

18. The method of claim 17, wherein the predetermined frequency content comprises one or more frequencies between about 10 kHz and about 50 MHz.

* * * * *